(12) United States Patent
Wada et al.

(10) Patent No.: US 10,758,816 B2
(45) Date of Patent: Sep. 1, 2020

(54) COMPUTER-READABLE RECORDING MEDIUM, METHOD, AND ELECTRONIC DEVICE THAT MODIFY A DISPLAY POSITION OF A PLURALITY OF CHARACTERS ON AN INTERFACE

(71) Applicant: GREE, INC., Tokyo (JP)

(72) Inventors: Takahisa Wada, Tokyo (JP); Suguru Suematsu, Tokyo (JP)

(73) Assignee: GREE, INC., Tokyo (JP)

( * ) Notice: Subject to any disclaimer, the term of this patent is extended or adjusted under 35 U.S.C. 154(b) by 28 days.

(21) Appl. No.: 15/922,347

(22) Filed: Mar. 15, 2018

(65) Prior Publication Data

US 2018/0264354 A1 Sep. 20, 2018

(30) Foreign Application Priority Data

Mar. 17, 2017 (JP) ................................ 2017-053763

(51) Int. Cl.
*A63F 13/2145* (2014.01)
*A63F 13/40* (2014.01)
(Continued)

(52) U.S. Cl.
CPC .......... *A63F 13/2145* (2014.09); *A63F 13/35* (2014.09); *A63F 13/40* (2014.09);
(Continued)

(58) Field of Classification Search
CPC .. G07F 17/214; G07F 17/2145; G07F 17/426; G07F 17/822
(Continued)

(56) References Cited

U.S. PATENT DOCUMENTS

2005/0159223 A1\* 7/2005 Tahara .................. A63F 13/537
463/43
2006/0073862 A1\* 4/2006 Shinoda .................. A63F 13/10
463/1
(Continued)

FOREIGN PATENT DOCUMENTS

| JP | 2015-150152 A | 8/2015 |
| JP | 2016-036613 A | 3/2016 |
| JP | 2016-189805 A | 11/2016 |

OTHER PUBLICATIONS

"A game, JELLIES—Kawaii designs and dreamlike stories, Catch the jellies to regain something yours," [online], Dec. 8, 2014, Appliv, [Searched on Jun. 19, 2017], Internet. <URL: https://mag.app-liv.jp/archive/1116>.

(Continued)

*Primary Examiner* — Chase E Leichliter
(74) *Attorney, Agent, or Firm* — Oblon, McClelland, Maier & Neustadt, L.L.P.

(57) ABSTRACT

A device that displays, on a touch panel display configured to receive a touch input, an interface for an electronic game, the interface including a plurality of characters each corresponding to one of a plurality of attributes; continuously modifies a display position of each of the plurality of characters on the interface; determines whether positions of a path of a touch input continuously received at the touch panel display are within a predetermined range of positions of each of a first plurality of characters displayed on the interface; associates the first plurality of characters in response to detecting that the positions of the continuously received touch input are within the predetermined ranges; and generates a predetermined effect within the electronic game based on the associated first plurality of characters upon determining that the touch input is released.

20 Claims, 15 Drawing Sheets

(51) Int. Cl.
*A63F 13/35* (2014.01)
*A63F 13/56* (2014.01)
*A63F 13/80* (2014.01)
*A63F 13/822* (2014.01)

(52) U.S. Cl.
CPC .............. *A63F 13/56* (2014.09); *A63F 13/80* (2014.09); *A63F 13/822* (2014.09); *A63F 2300/64* (2013.01)

(58) Field of Classification Search
USPC .......................................................... 463/9
See application file for complete search history.

(56) References Cited

U.S. PATENT DOCUMENTS

| | | | |
|---|---|---|---|
| 2006/0252531 A1* | 11/2006 | Kando | A63F 13/10 463/30 |
| 2006/0258453 A1* | 11/2006 | Kando | A63F 13/10 463/36 |
| 2006/0267955 A1* | 11/2006 | Hino | A63F 13/10 345/173 |
| 2007/0111804 A1* | 5/2007 | Sekimori | A63F 13/42 463/43 |
| 2008/0026843 A1* | 1/2008 | Nakasaka | G06F 3/04883 463/37 |
| 2008/0146328 A1* | 6/2008 | Ishii | A63F 13/10 463/31 |
| 2011/0212775 A1* | 9/2011 | Sano | A63F 13/426 463/31 |
| 2013/0296044 A1* | 11/2013 | Fujii | A63F 13/10 463/30 |
| 2013/0316817 A1* | 11/2013 | Tanzawa | G06F 3/0488 463/31 |
| 2016/0124518 A1* | 5/2016 | Takahashi | G06F 3/04842 463/31 |
| 2016/0193533 A1* | 7/2016 | Hirakawa | A63F 13/56 463/43 |
| 2016/0214014 A1* | 7/2016 | Shiota | A63F 13/2145 |
| 2016/0317915 A1* | 11/2016 | Onda | A63F 13/2145 |
| 2017/0072311 A1* | 3/2017 | Maejima | A63F 13/35 |
| 2017/0246537 A1* | 8/2017 | Edstrom | A63F 13/537 |
| 2018/0011529 A1* | 1/2018 | Tanzawa | G06F 3/0488 |

OTHER PUBLICATIONS

More and more play Puzzle & Dragon, "Fami-Con-Com (Family Computer Communication) App iPhone & Android No. 003," Enterbrain Inc., Japan, Aug. 2, 2012, p. 7-15.

* cited by examiner

COMPUTER-READABLE RECORDING MEDIUM, METHOD, AND ELECTRONIC DEVICE THAT MODIFY A DISPLAY POSITION OF A PLURALITY OF CHARACTERS ON AN INTERFACE

BACKGROUND

The present disclosure relates to a program, a control method, and an information processing device for processing the progress of a game.

In recent years, games have been developed which cause predetermined icons and characters to be in a non-display state in accordance with a player's input operation. A game disclosed in Japanese Laid-open Patent Publication No. JP 2016-189805 A includes a first display displaying a puzzle game that is a first game and a second display displaying performance with which a character is associated that is a second game. In the puzzle game that is the first game, when a reservoir is removed, in the second game, performance with which a character corresponding to the removed reservoir is associated is displayed. In addition, JP 2016-189805 A describes that, in a case where a chain of removal of a reservoir is generated in the puzzle game, the game is progressed by performing linked performance in which performance associated with a character that corresponds to a removed reservoir in the chain is sequentially displayed. JP 2016-189805 A describes that the amusement of a game can be improved by employing such a configuration.

In a conventional game, for example, like a game disclosed in JP 2016-189805 A, a reservoir to be removed is displayed to stop on the screen, and accordingly, a player performing an operation for the reservoir is not allowed to have tension and excitement. In addition, there is only one operation to be performed by the player for the reservoir to be removed, and a different action is not generated by a difference in the operation or the like. This provides a monotonous game having an insufficient strategic level, whereby the amusement of the game cannot be improved.

SUMMARY

An object of the present disclosure is to provide a program, a control method, and an information processing device for a game capable of progressing the game in association with an intuitive input operation of a player.

In order to achieve the above-mentioned object, according to an aspect of the present disclosure, there is provided a device that displays, on a touch panel display configured to receive a touch input, an interface for an electronic game, the interface including a plurality of characters each corresponding to one of a plurality of attributes; continuously modifies a display position of each of the plurality of characters on the interface; determines whether positions of a path of a touch input continuously received at the touch panel display are within a predetermined range of positions of each of a first plurality of characters displayed on the interface; associates the first plurality of characters in response to detecting that the positions of the continuously received touch input are within the predetermined ranges; and generates a predetermined effect within the electronic game based on the associated first plurality of characters upon determining that the touch input is released.

According to another aspect, there is provided a non-transitory computer-readable recording medium containing a program. The program, when executed by a processor, causes the processor to display, at a touch panel display configured to receive a touch input, an interface for an electronic game, the interface including a plurality of characters each corresponding to one of a plurality of attributes; continuously modify a display position of each of the plurality of characters on the interface; determine whether positions of a path of a touch input continuously received at the touch panel display are within a predetermined range of positions of each of a first plurality of characters displayed on the interface; associate the first plurality of characters in response to detecting that the positions of the continuously received touch input are within the predetermined ranges; and generate a predetermined effect within the electronic game based on the associated first plurality of characters upon determining that the touch input is released.

According to another aspect, there is provided a method performed by an electronic device, the method comprising: displaying, at a touch panel display configured to receive a touch input, an interface for an electronic game, the interface including a plurality of characters each corresponding to one of a plurality of attributes; continuously modifying a display position of each of the plurality of characters on the interface; determining whether positions of a path of a touch input continuously received at the touch panel display are within a predetermined range of positions of each of a first plurality of characters displayed on the interface; associate the first plurality of characters in response to detecting that the positions of the continuously received touch input are within the predetermined ranges; and generate a predetermined effect within the electronic game based on the associated first plurality of characters upon determining that the touch input is released.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the presently preferred embodiments together with the accompanying drawings in which:

FIGS. 10A to 12B are schematic diagrams that illustrate game contents displayed by a user interface of a mobile terminal according to an embodiment.

DETAILED DESCRIPTION OF THE PREFERRED EMBODIMENTS

Hereinafter, an embodiment of the present disclosure will be described in detail with reference to the drawings. Hereinafter, a configuration will be described in which an information processing device according to one aspect of the present disclosure functions as a mobile terminal (client device), and a program according to one aspect of the present disclosure is executed by the mobile terminal as a native application (native game). However, the mobile terminal can download information (for example, information relating to a new version of a game, information relating to other players, and the like) changing depending on the progress of a game by accessing a host device (a server or another mobile terminal) as is necessary and use the downloaded information. In addition, the mobile terminal can upload information changing depending on the progress of a game to the host device. In such a case, the mobile terminal may download or upload the information changing depending on the progress of a game in real time or at a predetermined period from or to the host device. In addition, the mobile terminal and the host device may bi-directionally exchange the information changing depending on the progress of a game. The bidirectional exchange may be performed either in real time or at a predetermined period. In addition, in a case where the mobile terminal cannot perform communication, a game may be progressed in the mobile terminal, and bi-directional exchange between the mobile terminal and the host device may be started at a time point at which communication with the host device can be performed.

Figure 1:
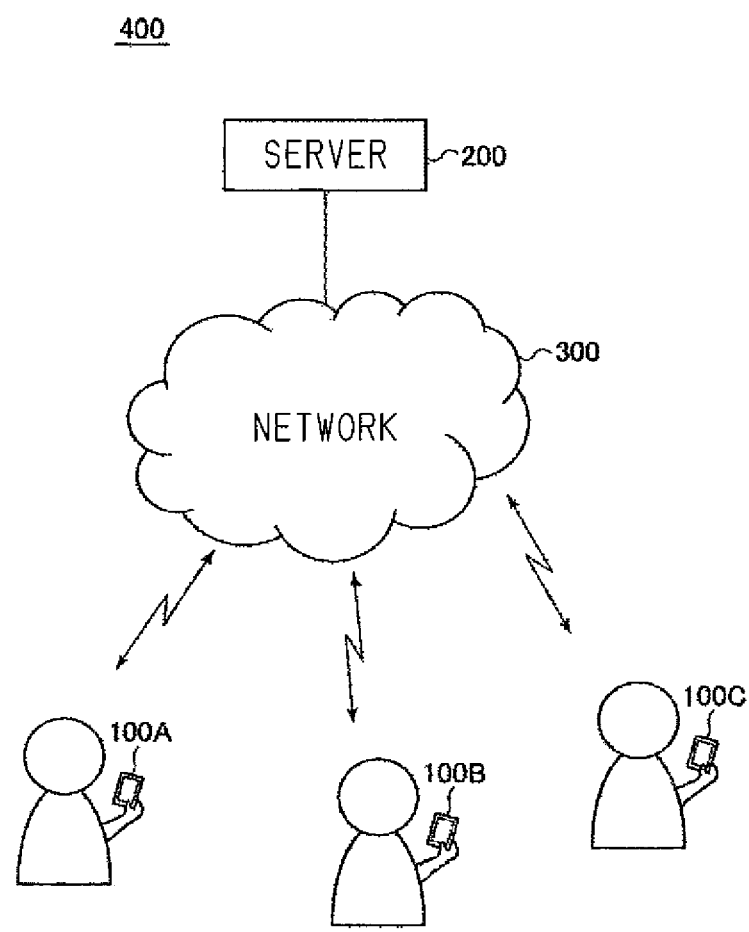
FIG. 1 is a schematic diagram that illustrates a configuration of a game system according to an embodiment.

FIG. 1 is a schematic diagram that illustrates the configuration of a game system according to an embodiment of the present disclosure. The game system includes mobile terminals 100A to 100C and a server 200. In the case illustrated in FIG. 1, while only three mobile terminals are illustrated for the simplification of description, it is apparent that more mobile terminals may be present.

Figure 2:
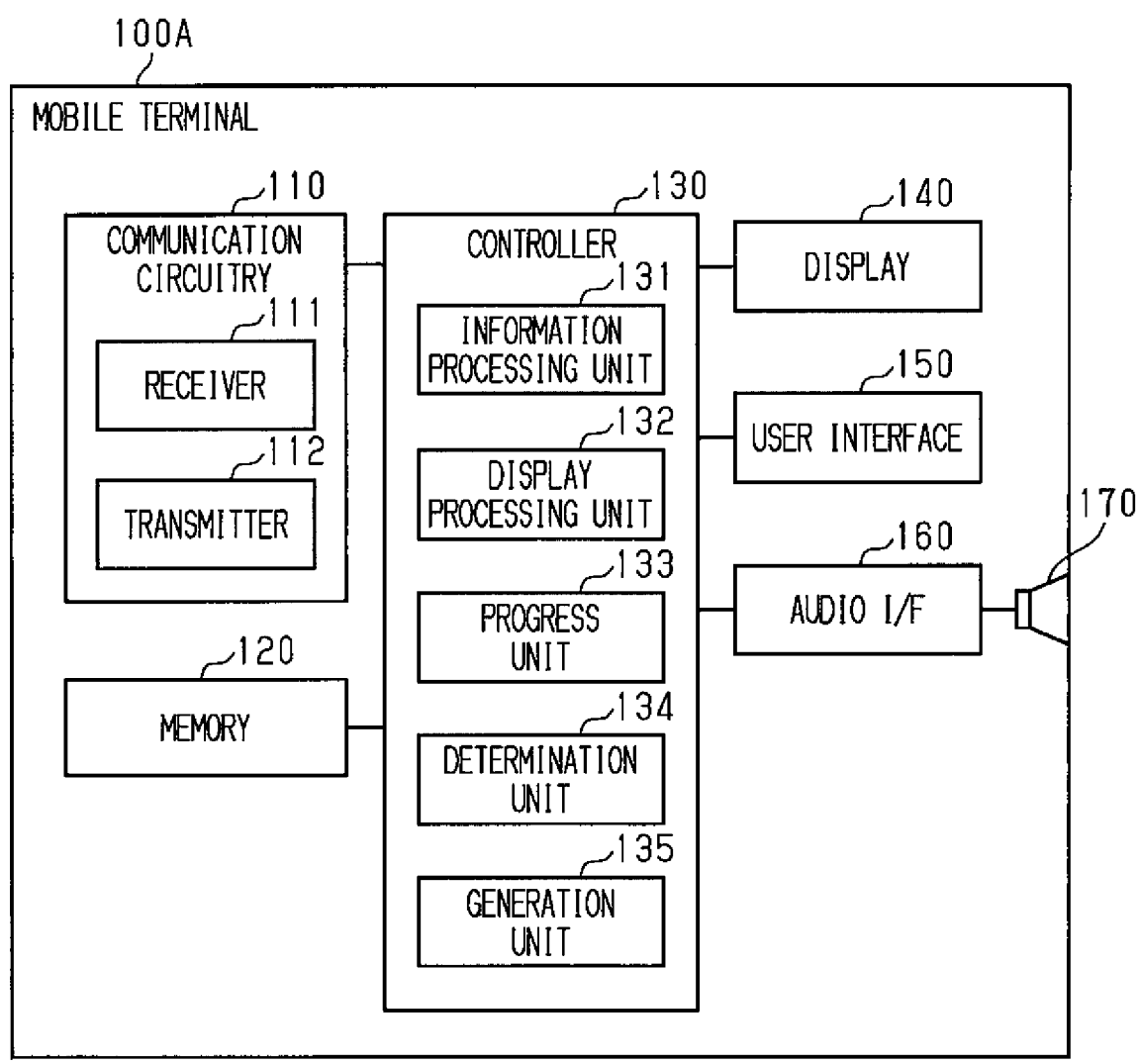
FIG. 2 is a block diagram that illustrates an example of a mobile terminal according to an embodiment.

FIG. 2 is a block diagram that illustrates an example of the main configuration of a mobile terminal 100A according to an embodiment of the present disclosure. The mobile terminal 100A is an information processing device capable of executing a program including a process to be described below. A specific device is not limited to the mobile terminal as long as the device can perform the process described below and for example, may be a smartphone, a tablet terminal, a home gaming device, a mobile telephone (feature phone), a personal computer, or any other electronic device. The program is appropriately executed by a multi-function device (for example, a smartphone or the like) including a display, a user interface capable of detecting a touch input using a finger, a stylus, or the like, a memory, and one or more processors capable of executing one or more programs stored in the memory.

As illustrated in FIG. 2, the mobile terminal 100A includes communication circuitry 110, a memory 120, a controller 130, a display 140, a user interface 150, an audio interface (I/F) unit 160, and a speaker 170.

The communication circuitry 110 includes a receiver 111 and a transmitter 112 and has a function of communicating with the server 200 or the other mobile terminals 100B and 100C through a network 300. The communication may be performed in either a wired manner or a wireless manner, and any communication protocol may be used as long as mutual communication can be performed.

The memory 120, for example, includes a main memory and an auxiliary memory each being realized by a read-only memory (ROM), a random access memory (RAM), or the like. The auxiliary memory may be realized, for example, by a flash memory or the like as an internal memory of the mobile terminal 100A and may be realized, for example, by a memory card or the like as an external memory. In addition, the memory 120 may include a hard disk drive (HDD), a solid state drive (SSD), or the like as the auxiliary memory. The memory 120 has a function of storing various programs and data that are necessary for the mobile terminal 100A to operate. In other words, in the memory 120, information (programs and data) of games installed in the mobile terminal 100A by using a method of player's downloading the information from a server through a network or the like is stored.

In the memory 120, information relating to a plurality of game contents in a game, information relating to predetermined conditions required for the progress of a game and various conditions, and the like are stored. Here, a game content is electronic data used for the progress of a game and, corresponds to an object used in a game including, for example, a character, an avatar, a card, and the like. In addition, the information relating to game contents, for example, includes images, attributes, and realities of the game contents, the degree of changes in parameters relating to the progress of a game that change at the time of being associated with players, and the like. The memory 120 stores the information relating to a plurality of game contents in association with parameters relating to the progress of a game.

In addition, the controller 130 reads a program and data stored in the ROM or the auxiliary memory and expands and stores the program and the data in the RAM. In other words, the RAM functions as a work memory of the controller 130 and stores temporary data and the like at the time of executing a program.

The display 140 is a device that displays a game view. In this embodiment, the display 140 may be realized by a liquid crystal display, an organic electroluminescence (EL) display, or the like. In FIG. 2, in order to clarify the function of each of the user interface 150 and the display 140, they are separately illustrated. However, for example, in a case where the user interface 150 is a touch panel, and the display 140 is a liquid crystal display, it is preferable that they be integrally configured.

The user interface 150 receives an operation input from a player. In this embodiment, the user interface 150 may be a touch panel capable of detecting multiple touches and detects a contact position of a player's finger or an indication tool such as a stylus and outputs coordinate information relating to the coordinates of the detected position to the controller 130. In this embodiment, the user interface 150 receives an operation input (touch, flick, or swipe) for a game content displayed on the display 140, designation of a parameter relating to the progress of a game, a touch on various buttons and the like, or the like that is performed by a player. A swipe is an operation of pressing a touch panel or the like at a certain position and then moving the pressed position in a predetermined direction. In addition, the user interface 150 may be realized by a key pad or a button, and information of a button pressed by a player may be output to the controller 130.

The audio I/F 160 is an interface of the speaker 170 or an earphone not illustrated in the drawing. When sound effects, background music (BGM), or the like is reproduced in a game, the controller 130 outputs an audio from the speaker 170 or the earphone through the audio I/F 160.

The controller 130 is a processor having a function of controlling each unit of the mobile terminal 100A. The controller 130 includes an information processing unit 131, a display processing unit 132, a progress unit 133, a determination unit 134, and a generation unit 135. The information processing unit 131 retrieves coordinate information output from the user interface 150 at a predetermined time interval and outputs a series of coordinate information to each unit as a trajectory. The display processing unit 132 translates display data output from the information processing unit 131 or any other functional unit into pixel information and outputs the translated pixel information to the display 140. The progress unit 133 has a function of progressing a game. In addition, the determination unit 134 determines generation/no-generation of a field 20 to be described below.

Figure 3:
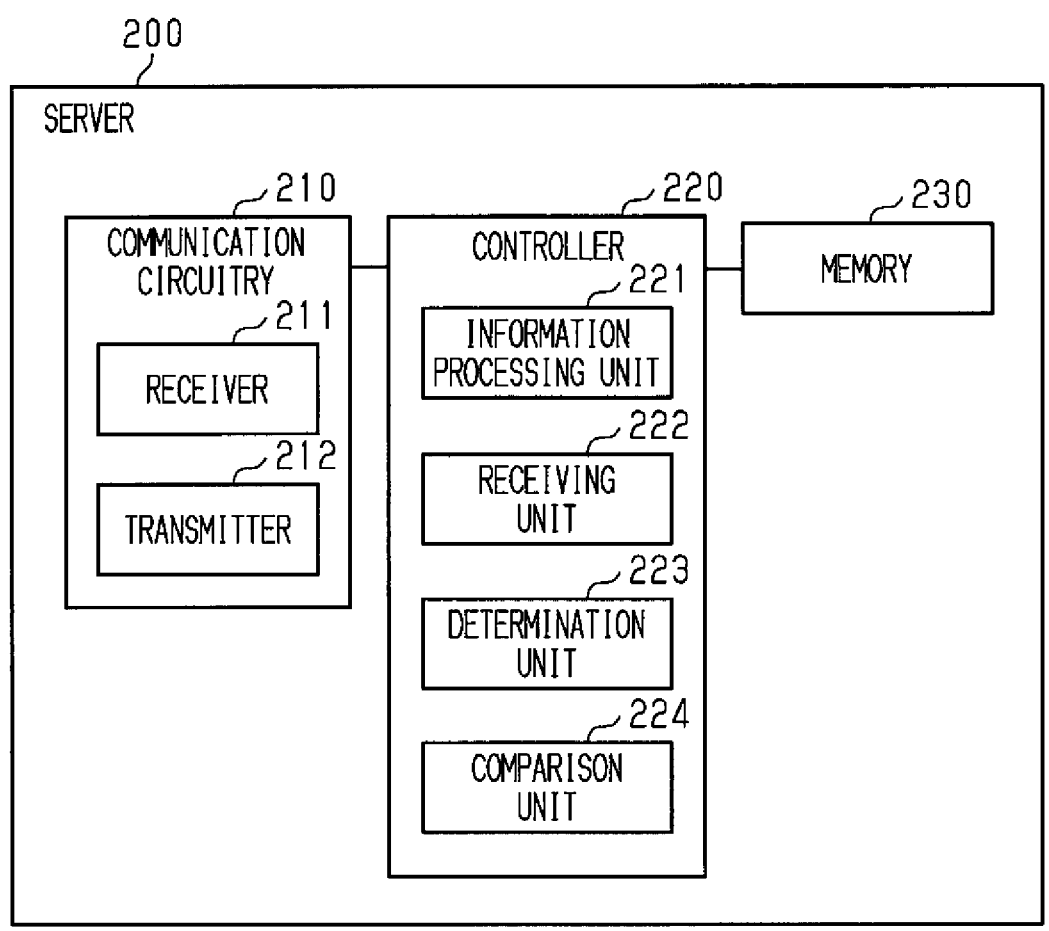
FIG. 3 is a block diagram that illustrates an example of a server according to an embodiment.

Next, the server 200 will be described. FIG. 3 is a block diagram that illustrates an example of the main configuration of the server 200 according to an embodiment of the present disclosure. As illustrated in FIG. 3, the server 200 includes at least a communication circuitry 210, a controller 220, and a memory 230.

The communication circuitry 210 includes a receiver 211 and a transmitter 212 and has a function of communicating with the mobile terminals 100A to 100C through the network 300 in accordance with an instruction from the controller 220. The receiver 211 receives messages and player information including the progress status of a game of each player transmitted from the mobile terminals 100A to 100C. The transmitter 212 transmits other-player information and messages exchanged among players to the mobile terminals 100A to 100C.

The controller 220 is a processor having a function of controlling each unit of the server 200. The controller 220 includes an information processing unit 221 and a comparison unit 224. The information processing unit 221 performs various processes of information transmitted or received by the communication circuitry 210 and the like. The comparison unit 224 compares player information of players with each other and determines other-player information to be transmitted to the players. The memory 230 has a function of storing (saving) various programs and data that are necessary for the server 200 to operate. The memory 230 stores player information (a progress status of a game, owned items, acquired game contents, an activity status, an interaction history with other players, and the like) of each player. The memory 230, for example, includes a main memory and an auxiliary memory each being realized by a read-only memory (ROM), a random access memory (RAM), or the like. The auxiliary memory, typically, is realized by various non-transitory recording media such as a hard disc drive (HDD), a solid state drive (SSD), a flash memory, and the like. The controller 220 reads a program and data stored in the ROM or the auxiliary memory and expands and stores the program and the data in the RAM functioning as a work memory. In other words, the RAM stores temporary data at the time of executing a program and the like.

Next, the outline of a game realized by a program according to an embodiment of the present disclosure will be described with reference to FIGS. 4 to 8.

Figure 4:
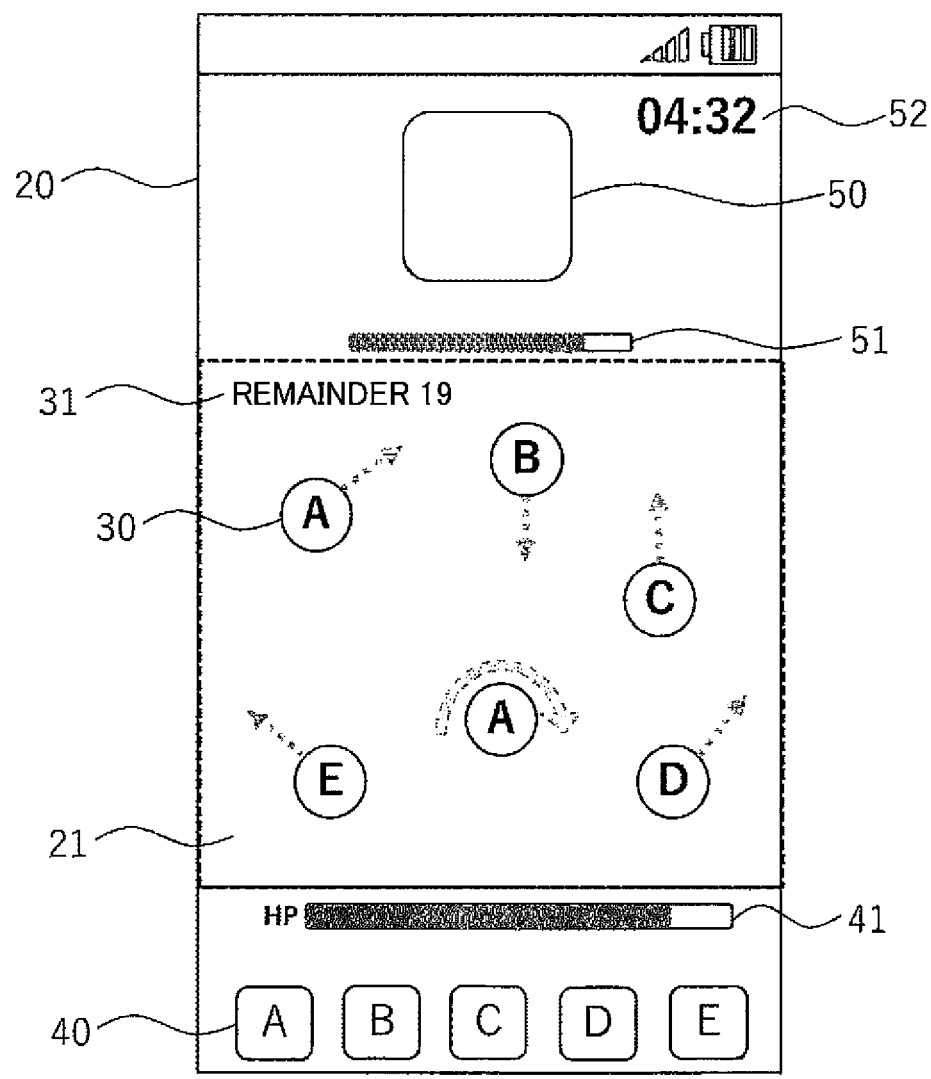
FIGS. 4 to 7B are schematic diagrams that illustrate game contents displayed on a user interface of a mobile terminal according to an embodiment.

FIG. 4 is a schematic diagram that illustrates a game content displayed on the display 140 of the mobile terminal 100. As illustrated in FIG. 4, a game according to an embodiment of the present disclosure includes a field 20 that is displayed as a game content. In addition, the game may include a plurality of fields 20.

The field 20 becomes different depending on a game content, and the field 20 illustrated in FIG. 4 is a field of a game content that progresses by receiving a predetermined input operation for a character 30 and causing the character 30 to be in a non-display state from the field. The field 20, for example, includes a predetermined area in which the character 30 can move. In this way, the character 30 is displayed in a game view on a display screen to move to the upper side, the lower side, the left side, and the right side at an arbitrary speed in a predetermined area inside the field 20.

In the example illustrated in FIG. 4, the character 30 is positioned inside an area 21 disposed in a center portion of the field 20 and can move inside the area. The character 30 may progress linearly or in a zigzag pattern inside the area of the field 20. In addition, the character 30 may rotate at an arbitrary position or stop at the arbitrary position inside the area 21. Furthermore, when arriving at a peripheral edge portion inside the area 21, the character may rebound from the peripheral edge portion and continue to move. In addition, the motion of the character may be switched from one operation (for example, a rotation operation) to another operation (for example, an operation of going straight) at an arbitrary position and at an arbitrary timing. Such a method of moving the character 30 is merely an example, and it is apparent that any moving method may be used.

As illustrated in FIG. 4, a plurality of characters 30 may be arranged in the field 20. In the example illustrated in FIG. 4, although six characters 30 are arranged, the number of characters 30 arranged in the field 20 is not limited to six but may have any value.

In the field 20 illustrated in FIG. 4 as an example, the moving speed of the character 30 may be constant all the time or be changed. In addition, in the field 20, the character 30 does not need to continuously move but may repeat advancement and stop regularly or irregularly.

The appearance of the character 30 is different depending on a game content. The character 30, for example, may be any object such as a person, an animal, fish, an insect, or the like and may be a car, an airplane, or the like. The character 30 does not need to be an icon or an image of an animal or the like and, for example, may be a symbol such as ○ or Δ, a letter, or the like. In other words, the character 30 may be any object as long as it is arranged in the field 20 and can move inside the area 21 of the field 20.

Each of the characters 30 belongs to one of a plurality of attributes. In the example illustrated in FIG. 4, each of the characters 30 belongs to one of a plurality of attributes A to E. Each of the plurality of attributes may include a meaning relating to a game content. For example, the plurality of attributes may be, for example, an attribute of "fire", an attribute of "water", an attribute of "soil", an attribute of "wind", an attribute of "light", and the like. In addition, the attribute may be any object as long as it relates to a game content and is not limited to such examples.

Here, the display form of the character 30 is changed depending on the attribute set to the character 30. As a change in the display form, for example, there is a "color" of the character 30 in the field 20. In other words, the "color" of a character 30 in the field 20 is changed depending on the attribute of the character 30. In addition, as a display form to be changed, for example, there is a "shape" of the character 30 in the field 20. The "shape" of the character 30 in the field 20 may be changed depending on the attribute of the character 30. In addition, as a display form to be changed, for example, there is a "size" of the character 30 in the field 20. The "size" of the character 30 in the field 20 may be changed depending on the attribute of the character 30. In this way, the attribute of the character 30, for example, corresponds to the display form of the character 30 in the field 20.

The character 30 inside the area 21 of the field 20 is caused to be in a non-display state in accordance with a predetermined input operation of a player. In other words, in a case where the number of characters 30 displayed inside the area 21 of the field 20 decreases by a predetermined operation of the player and finally becomes a predetermined number or less (for example, zero), the game ends. In addition, separately from the end condition of the game depending on the number of characters 30, another end condition may be set, and, for example, also in a case where a predetermined time elapses after the start of a game, the game may end. The predetermined time may have any length, for example, one minute, five minutes, or the like and may be set by the player. In addition, an icon or an image 32 representing a predetermined number representing the number of characters 30 displayed in the field 20 may be displayed in a game view. The icon or the image 32 has a value decreased by the number of displayed new characters 30 every time the new characters 30 are displayed. As illustrated in FIG. 4, for example, "Remainder 19" is displayed as the icon or the image 32.

In addition, up to a predetermined number set in advance, every time the character 30 is caused to be in the non-display state on the basis of a predetermined operation of the player, a new character 30 may be configured to be displayed. In such a case, every time a character 30 is caused to be in the non-display state on the basis of a predetermined operation of the player, a new character 30 is displayed. Then, when the number of newly displayed characters 30 arrive at a predetermined number set in advance, thereafter, even in a case where a character 30 is caused to be in the non-display state on the basis of a predetermined operation of the player, no new character 30 may be displayed. In other words, in addition to the number of characters 30 displayed inside the area 21 of the field 20 at a time point at which a game starts, in a case where characters 30 of a predetermined number set in advance are caused to be in the non-display state on the basis of a predetermined operation of a player, the game may be configured to end.

In FIG. 4, in a lower portion of the field 20, a player character 40 is displayed. The player character 40 is a character of a game associated with a player. A player can use the player character 40 for changing the parameter of an enemy character 50 (to be described later). The parameter of the player character 40 is stored in association with the player character 40. The parameter of the enemy character 50 is changed on the basis of a player's operation of selecting the player character 40 at a predetermined timing. The parameter of the player character 40, for example, may be displayed as an image of a gauge shape in relation with a predetermined action of the player character 40. In addition, in a case where the parameter of the player character 40 is a predetermined amount or more, the player's operation of selecting the player character 40 can be performed at an arbitrary timing, and the parameter of the enemy character 50 can be changed (for example, decreased) by the operation. In addition, in a case where the parameter of the player character 40 becomes a predetermined amount, automatically, the parameter of the enemy character 50 may be changed. In such a case, the parameter of the enemy character 50 can be changed without a player's operation of selecting the player character 40.

As illustrated in FIG. 4, a plurality of player characters 40 may be provided. Each of the plurality of player characters 40 belongs to one of the plurality of attributes. As illustrated in FIG. 4, the attributes of the player characters 40 respectively correspond to A to E that are attributes of the character 30. For example, in a case where the parameter of the player character 40 becomes a predetermined value or more, a predetermined action on the basis of the attribute corresponding to the player character 40 is set to be executable. Here, the predetermined action that is executed in a case where the parameter of the player character 40 becomes the predetermined value or more does not need to be on the basis of the attribute corresponding to the player character 40 and may be an arbitrary action. The arbitrary action, for example, may be any action such as an action set in advance, an action randomly selected from among a plurality of actions, or the like. In the example illustrated in FIG. 4, although the player character 40 is provided for each of the plurality of attributes, the player character does not necessarily need to be provided for each of the plurality of attributes, and the player character 40 corresponding to at least one attribute may be provided.

The icon or the image 41 illustrated in FIG. 4 is an icon or an image that indicates the amount of the parameter stored in relation with the player. In a game, a parameter of a predetermined amount in relation with a player is stored, it is necessary to progress the game such that the parameter becomes not a predetermined threshold (for example, zero). In addition, when the parameter stored in relation with the player becomes the predetermined threshold or less, the game ends. The parameter stored in relation with the player may be associated with the player or the player character 40. The parameter stored in relation with the player, for example, is a physical power value of the player or a physical power value of the player character 40 and may be a sum value of the physical power value of the player and the physical power value of the player character 40.

The icon or the image 41 can indicate a change in the parameter of the player and, for example, may allow the player to visually recognize that the parameter is decreased by a predetermined action of the enemy character 50.

In FIG. 4, in an upper portion of the field 20, the enemy character 50 is displayed. The enemy character 50 is a character that is an enemy of the player in a game and executes a predetermined action of decreasing a parameter stored in relation with the player. The enemy character 50 executes a predetermined action for decreasing the parameter of the player at a predetermined timing.

An icon or an image 51 illustrated in FIG. 4 is an icon or an image that indicates the remaining amount of the parameter of the enemy character. In a game, a predetermined amount of a parameter is assigned to the enemy character 50, and the game is preferably progressed such that the parameter of the enemy character 50 is a predetermined threshold (for example, zero) or less.

The icon or the image 41 can indicate a change in the parameter of the enemy character 50 and, for example, can allow a player to visually recognize that the enemy character 50 has decreased.

In the first embodiment, a player, for example, performs a predetermined input operation for the character 30 displayed in the field 20, thereby causing the character 30 to be in the non-display state from the field 20 to progress the game.

The user interface 150 detects an input operation by a player's touch on a display screen displaying the game view illustrated in FIG. 4 or a flick or a swipe using a finger or a stylus such as a pen in the horizontal direction of the display screen. More specifically, the user interface 150 detects a player's touch on a character 30 displayed in the area disposed inside the field 20 and causes the character 30 to be in the non-display state as a result of the detection. In addition, the information processing unit 131 does not determine that the character 30 becomes the non-display state but determines that the character 30 is caused to be in the non-display state in a case where a player's touch is detected and performs the process of causing the character 30 to be in the non-display state as a result of the determination. In addition, the user interface 150 may detect reception of a player's continuous input operation (for example, a flick or a swipe) in a plurality of characters 30 displayed in the area disposed inside the field 20. The user interface 150 may detect the movement of the position at which the input operation is performed as the continuous input operation. For example, the user interface 150 may detect that the position at which the player's input operation is performed has moved from the position of one character 30 to a predetermined range associated with another character 30. When an input operation is detected from a player, the user interface 150 continuously detects a position at which a player's input operation is performed at a predetermined time interval until the input operation is released. The user interface 150 may detect the release of the input operation, for example, as a touch off from the display screen. A touch off represents a state in which the display screen is not touched any more by a player's finger or stylus. The predetermined time interval may be changed on the basis of the amount of change in the position at which the input operation is detected. For example, in a case where the amount of change in the position at which the input operation is detected is relatively large, the user interface 150 may shorten the predetermined time interval. On the other hand, for example, in a case where the amount of change in the position at which the input operation is detected is relatively small, the user interface 150 may lengthen the predetermined time interval. By changing the time interval of the detection of an input operation on the basis of the amount of change in the position at which the input operation is detected, also in a case where the amount of change in the input operation position is large, the position at which the input operation is performed can be accurately detected. In addition, by changing the time interval of the detection of an input operation, the processing load for detecting an input operation and the amount of data relating to a detected input operation can be decreased to be less than those of a case where the predetermined time interval is constantly set to be short by the user interface 150. A timing at which the character 30 is caused to be in the non-display state, for example, is a timing at which it is determined that a player's input has been received. In addition, the timing at which the character 30 is caused to be in the non-display state, for example, may be a timing at which it is determined that a player's input has been completed.

As illustrated in FIG. 4, an icon or an image 52 indicating an elapse time from the start of the game may be displayed.

Figure 5A:
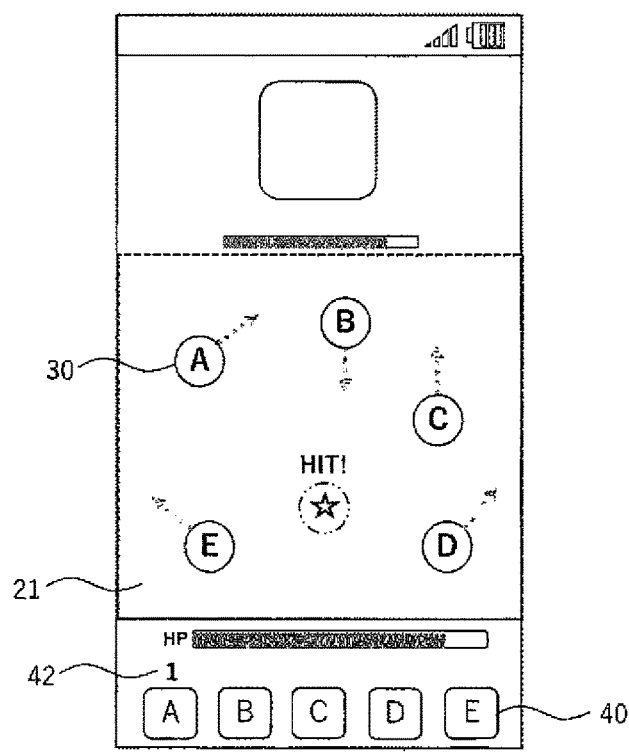
Figure 5B:
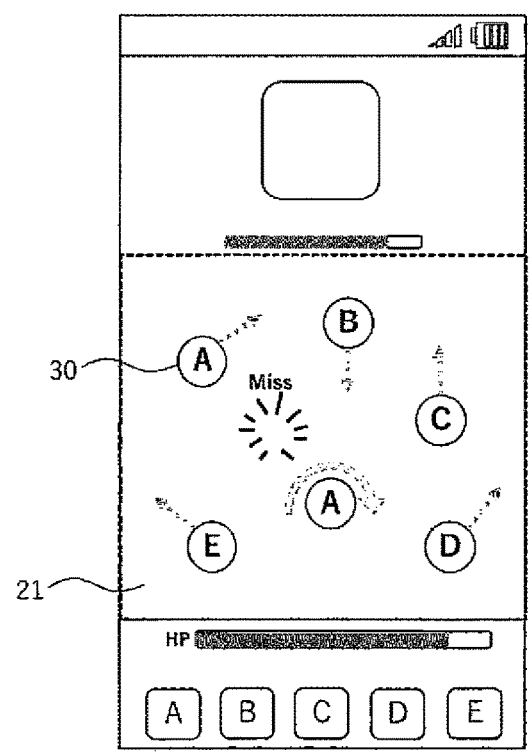

FIGS. 5A and 5B are schematic diagrams illustrating game contents displayed on the display 140 in accordance with a player's operation in a game. FIGS. 5A and 5B are examples of display of a game view in a case where a touch is made as a predetermined input operation.

As illustrated in FIGS. 5A and 5B, in a case where a character 30 is touched by a player, the character 30 is caused to be in the non-display state in the field 20. In this case, as illustrated in FIG. 5A, a predetermined mark (in the example illustrated in FIG. 5A, a mark of a star) may be displayed at the position of the character 30 caused to be in the non-display state, and an icon or text of "HIT!" may be disposed on the periphery of the character 30 caused to be in the non-display state.

More specifically, the information processing unit 131 of the mobile terminal 100A receives a player's input operation (for example, a touch) for the user interface 150 and determines whether or not the position at which the input operation is performed is included in a predetermined range associated with a character 30 displayed on the display 140.

Then, in a case where the position at which the player's input operation is performed is determined to be within the predetermined range associated with a character 30, the information processing unit 131 determines the character 30 as being a selected character 30. At that time, the display processing unit 132 may display the selected character 30 in a form indicating the selection. The display processing unit 132, for example, displays movement of the selected character 30 on the field 20 in a fixed form. Thereafter, in a case where the input operation is released by the player, the display processing unit 132 causes the selected character 30 to be in the non-display state. The predetermined range associated with the character 30 is, for example, a portion in which the character 30 is displayed on the display 140. In addition, the predetermined range associated with the character 30, for example, may be a range including the vicinity of the displayed character 30. For example, in a case where a player's input operation is detected in a range that is separate from the range in which a character 30 is displayed by an arbitrary number of pixels on the display 140, the user interface 150 may determine that the character 30 has been selected. Here, a pixel is a minimal unit (minimal element) having color information (a color tone and a gradation) in the display 140. By setting the predetermined range associated with a character 30 to be the range including the vicinity of the character 30, the probability of determining the position at which a player's input operation is performed, which is performed by the user interface 150, as being within the predetermined range becomes higher than that of a case where the vicinity is not included. For example, also in a case where the position at which a player's input operation is performed is on the peripheral edge of the range in which a character 30 is displayed, the character 30 can be determined as being a selected character 30. In this way, the frequency at which the user interface 150 determines the position at which the player's input operation is performed as not being within the predetermined range can be lowered. In addition, the display processing unit 132 may display a mark of a star at the position of the character 30 caused to be in the non-display state, and an icon, an image, or a text of "HIT!" on the periphery of the character 30.

In this case, the parameter of the "player character 40" corresponding to the attribute of the character 30 is increased. For example, in a case where the character 30 of the attribute A is caused to be in the non-display state, the parameter of the "player character 40" corresponding to the attribute A is increased by a predetermined amount (for example, "1").

In addition, the value of the parameter of the "player character 40", as illustrated in FIG. 5A, is, for example, displayed as a numerical value 42 on the upper side of the player character 40. In the example illustrated in FIG. 5A, it is displayed that the parameter of the player character 40 of the attribute A is increased by the causing of the character 30 of the attribute A to be in the non-display state, and the value of the parameter becomes "1". The numerical value 42 may be displayed on the vicinity of the player character 40 or displayed to be superimposed on the player character 40, as a predetermined image. The predetermined image is, for example, is an image indicating the value of the parameter of the "player character 40" by using a gauge, a pie chart, or the like.

In addition, in a case where a portion other than a character 30 in the field 20 is touched by the player, a predetermined icon or an image representing a miss and an icon, an image, or text data of "Miss" may be displayed on the periphery of the touched place in the field 20. A case where the predetermined icon or image representing a miss is displayed is, for example, a case where a portion other than the predetermined range associated with the character 30 in the field 20 is touched by the player.

For example, the information processing unit 131 of the mobile terminal 100A may determine whether or not a position, at which a player's touch is performed, detected by the user interface 150 is included within the predetermined range associated with a character 30 displayed on the display 140. Then, in a case where the information processing unit 131 determines that the position is out of the predetermined range, the display processing unit 132 may display a predetermined icon or image indicating a miss and an icon, an image, or text data of "Miss" on the periphery of the touched place. Here, a miss is a failure in player's causing the character to be in the non-display state.

Figure 6C:
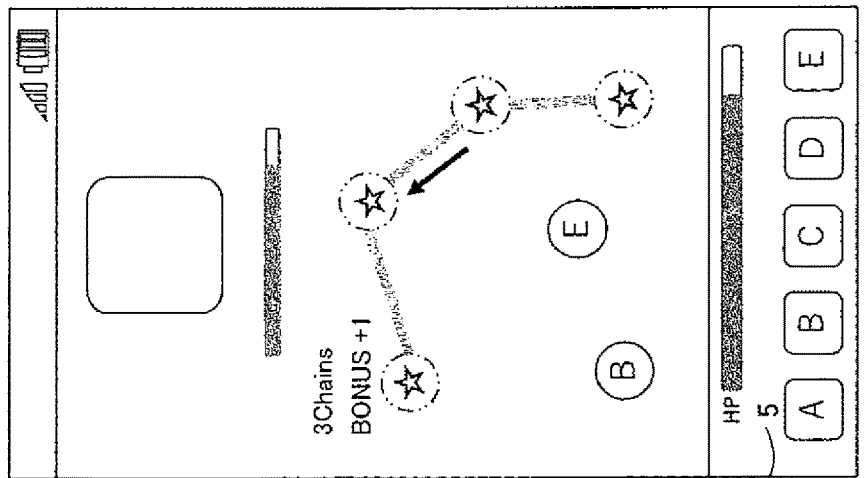
Figure 6B:
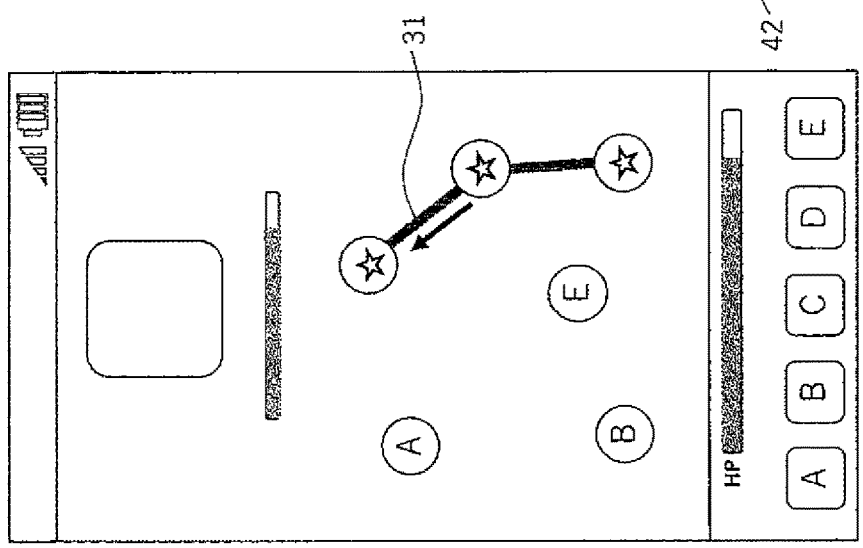
Figure 6A:
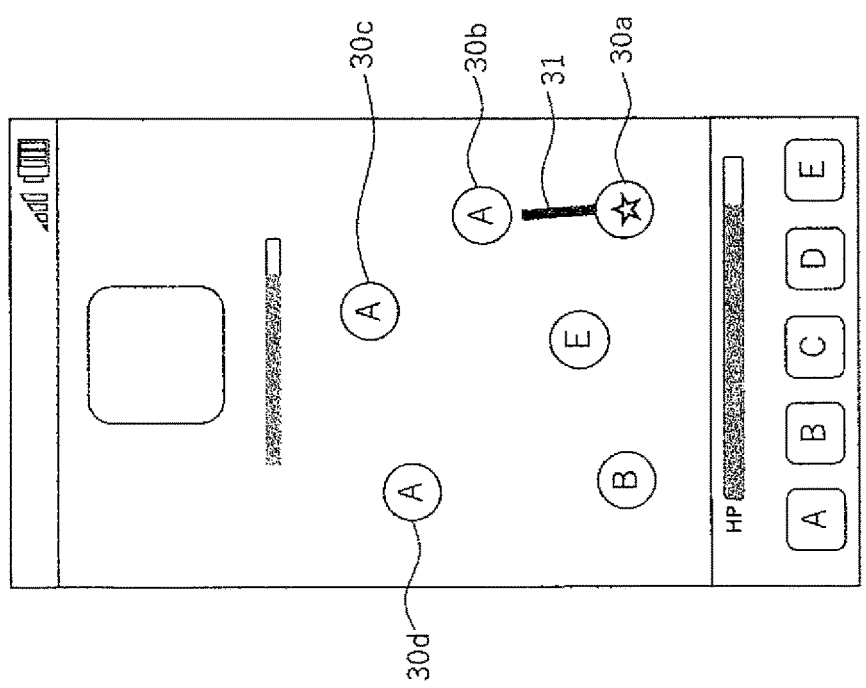

FIGS. 6A to 6C are other schematic diagrams illustrating game contents displayed by the display 140 in accordance with detection of a player's input operation. As illustrated in FIGS. 6A to 6C, in a case where, after a player's input operation for one character 30 is detected, the input operation is continuously detected, and, the position of the input operation is determined to have been moved up to a predetermined range associated with another character 30, a player's input operation for a plurality of characters 30 (in other words, the one character 30 and the other character 30) can be received at a time.

As illustrated in FIGS. 6A to 6C, after detection of a player's input operation (touch) for a character 30a, the information processing unit 131 continuously detects the input operation (touch operation) and determines that the position of the input operation (the touched position) has moved up to a predetermined range associated with another character 30. As a result, the information processing unit 131 associates one character 30a with another character 30b. In addition, the characters 30 that can be associated with each other are characters 30 belonging to the same attribute. In other words, one character 30a and another character 30b, as illustrated in FIG. 6A, are characters 30 belonging to the same attribute A.

As a specific process, the information processing unit 131 of the mobile terminal 100A receives a player's input operation for the user interface 150 and determines whether or not the input operation is included within the predetermined range associated with a character displayed on the display 140.

Then, in a case where the operation is determined to be within the predetermined range and the input operation is continuously detected, the information processing unit 131 determines that the position of the player's input operation has moved up to a predetermined range relating to another character 30. In other words, the information processing unit 131 determines whether or not the position of the input operation after the movement is included in the predetermined range relating to another character 30. Then, in a case where the operation is determined to be within the predetermined range, the information processing unit 131 associates the one character 30 with the other character 30. Thereafter, in a case where the input operation is continued, the information processing unit 131 performs a similar process and can associate a plurality of characters 30 with each other. Then, when the player's input operation for the touch panel is released, the display processing unit 132 simultaneously causes a plurality of characters 30 associated with other to be in the non-display state.

Here, in a case where the player selects a character 30 inside the area 21 of the field 20, the information processing unit 131 performs the process of stopping the movement of the selected character 30 inside the area 21. As a result, the display processing unit 132 displays the character 30 selected by the player in a state in which the display position is fixed within the area 21 of the field 20.

More specifically, in the case illustrated in FIG. 6A, the display processing unit 132 fixes the display position of a character 30a inside the area 21 at a time point at which the player selects the character 30a first. In addition, as illustrated in FIG. 6B, in a case where it is detected that the position of the player's input operation has moved from the position of one character 30 to a predetermined range associated with another character 30, the display processing unit 132, in addition to the character 30a that has been selected first, also fixes the display position of the character 30b selected by the player thereafter inside the area 21.

In addition, in a case where the character 30 is selected in advance, the display processing unit 132 displays an image 31 of a line segment joining the selected character 30 and the position of the current input operation on the display 140. As illustrated in FIG. 6A, the image 31 of the line segment may be a straight line joining the position of the current input operation and the character 30 selected previously. In addition, the image 31 of the line segment may represent a trajectory of the movement of the input operation in the touch panel.

In the example illustrated in FIG. 6C, the user interface 150 detects a player's continuous input operation and determines sequential movement of the position of the input operation from the position of the character 30a to predetermined ranges associated with the other characters 30b to 30d and thus associates the characters 30a to 30d with each other. Then, when the player's input operation is released in a state in which the characters 30a to 30d are associated with each other, the display processing unit 132 causes the characters 30a to 30d associated with each other to be in the non-display state at a time.

In this case, the information processing unit 131 increases the parameter of the "player character 40" corresponding to the attribute of the character 30. For example, in a case where the character 30 of the attribute A is caused to be in the non-display state, the information processing unit 131 increases the parameter of the "player character 40" corresponding to the attribute A by a predetermined amount.

Here, the increased amount of the parameter may be changed depending on the number of the associated characters 30. In the example illustrated in FIG. 6C, the information processing unit 131 may increase the parameter of the "player character 40" by "5" that is obtained by adding "1" as a bonus point to "4" that is the number of the characters associated with each other in one input operation.

In addition, in a case where a plurality of the characters 30 associated with each other are caused to be in the non-display state, the display processing unit 132 displays a predetermined icon, an image, or text data on the periphery of the character 30d that is associated last. For example, the display processing unit 132 displays "3 Chain" representing the number of characters 30 associated with each other and "Bonus+1" representing a bonus point assigned depending on the number of the characters associated with each other. The Chain may be displayed as the number of chains and represents the number of "associations". In the example illustrated in FIG. 6C, since the number of the characters 30 associated with other is "4", the number of chains (in other words, the number of associations) is "3".

The value of the parameter of the "player character 40" is, as illustrated in FIG. 6C, for example, displayed as a numerical value 42 on the upper side of the character 40. In addition, the numerical value 42 may be displayed on the vicinity of the player character 40 or displayed to be superimposed on the player character 40, as a predetermined image. In the example illustrated in FIG. 6C, by causing a plurality of the characters 30 of the attribute A to be in the non-display state, it is displayed that the parameter of the player character 40 of the attribute A is increased and the value of the parameter becomes "5" as the numerical value 42.

As described above, in a case where a plurality of characters 30 (in other words, one character 30 and another character 30) are selected by a player's continuous input operation, the plurality of selected characters 30 are caused to be in the non-display state.

Figure 7B:
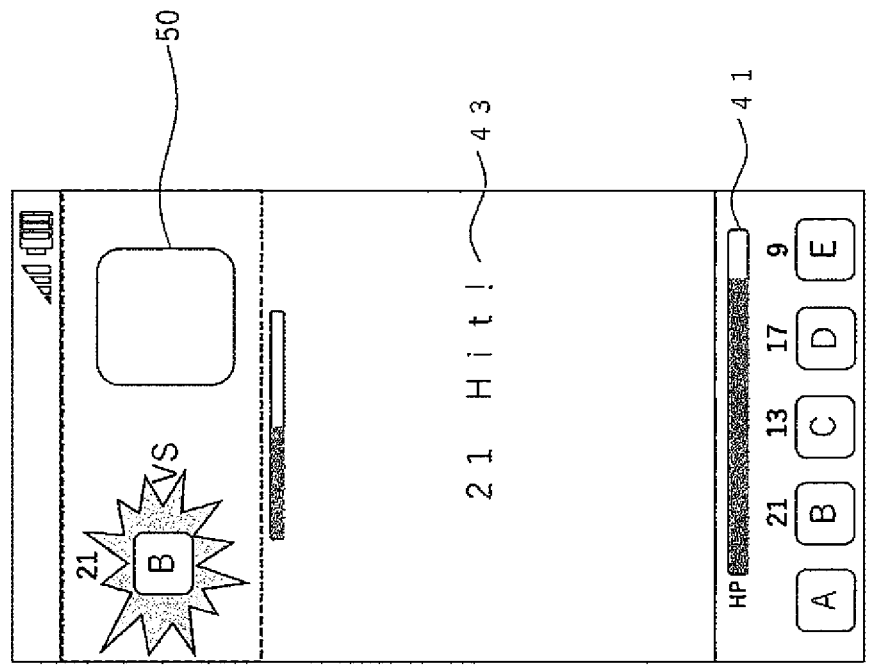
Figure 7A:
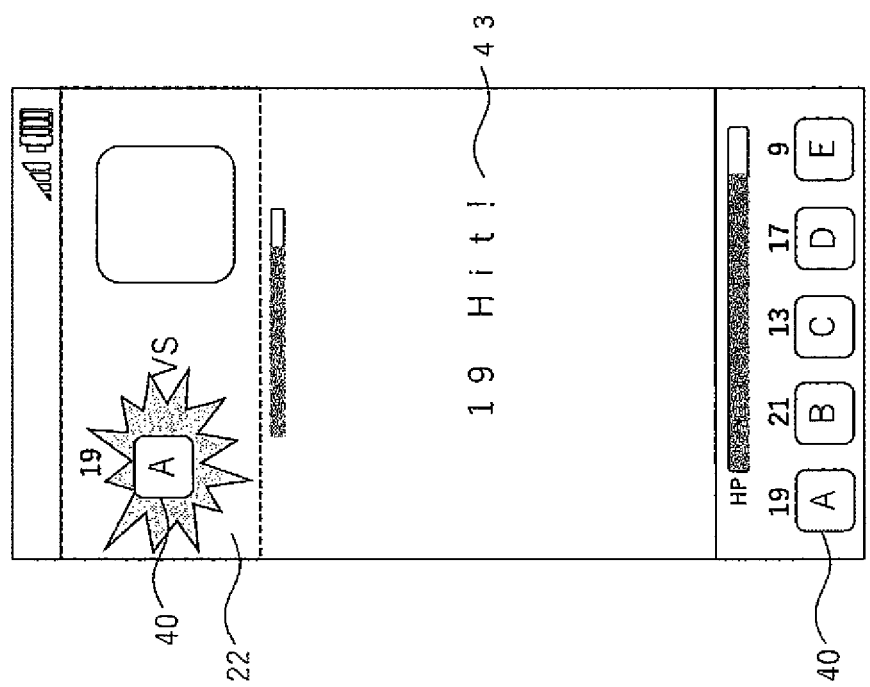

FIGS. 7A and 7B are other schematic diagrams illustrating game contents displayed on the display 140. FIGS. 7A and 7B are display examples of a game view of a case where all the characters 30 inside the area 21 of the field 20 are caused to be in the non-display state. A case where all the characters 30 are caused to be in the non-display state does not mean a case where the characters 30 are temporarily caused to be in the non-display state from the inside of the area 21 of the field 20 but means a case where all the characters of a predetermined number set to be displayed in advance have been caused to be in the non-display state. As described above, the information processing unit 131 may display a new character 30 every time a character 30 is caused to be in the non-display state on the basis of a player's predetermined operation up to a predetermined number set in advance. In such a case, a case where all the characters 30 are caused to be in the non-display state is a case where characters 30 of a predetermined number set in advance are caused to be in the non-display state in addition to the number of characters 30 displayed inside the area 21 of the field 20 at a game start time point. In other words, the case described above is a case where, although a character 30 is caused to be in the non-display state, a new character 30 is not displayed, and, as a result, all the characters 30 inside the area 21 of the field 20 is in the non-display state.

As illustrated in FIG. 7A, in an area 22 of the field 20, at least one player character 40 is displayed in a form confronting (coping with) the enemy character 50. Thereafter, the information processing unit 131 changes the parameter 51 of the enemy character 50 by a predetermined amount in accordance with the numerical value 42 of the parameter of the player character 40. FIG. 7A is a form of a case where the information processing unit 131 decreases the parameter 51 of the enemy character 50 by a predetermined amount on the basis of the numerical value 42 of the parameter of the player character 40 of the attribute A. As illustrated in FIG. 7A, when the player character 40 of the attribute A executes a predetermined action, the information processing unit 131 changes the parameter 51 of the enemy character 50. As the predetermined action, for example, the player character 40 makes an attack depending on the attribute of the player character 40 against the enemy character 50. An attack decreases the parameter 51 of the enemy character 50. In addition, as illustrated in FIGS. 7A and 7B, the amount of change in the parameter of the enemy character 50 may be displayed as an icon or an image 43 in the game view. In FIG. 7A, "19 Hit!" is displayed as an icon or an image 43 as the amount of change in the parameter of the enemy character 50, and, in FIG. 7B, "21 Hit!" is displayed as an icon or an image 43.

In the game view, performance representing an attack content depending on the attribute of the player character 40 may be displayed. For example, in a case where the attribute A is the attribute of the "wind", performance representing an attack content representing that "the enemy character 50 is attached by generating a tornado" is displayed in the game view. In addition, in the game view, any performance may be displayed as long as the player can recognize that the player character 40 attacks the enemy character from the performance.

In addition, the amount of change in the parameter 51 of the enemy character 50 may be changed depending on the compatibility between the attribute of the player character 40 and the enemy character 50. For example, in a case where the compatibility between the attribute of the player character 40 and the enemy character 50 is high, the amount of change in the parameter 51 of the enemy character 50 may be set to be large. More specifically, as the attribute of the player character 40, there may be an "advantageous attribute" greatly changing the parameter 51 of the enemy character 50 more than other attributes, and such a case is a case where the compatibility between the player character 40 and the enemy character 50 is high. For example, for the enemy character 50 of the attribute "water", the character 40 of the attribute "tree" is the player character 40 of an "advantageous attribute". Thus, the player character 40 of the attribute "tree" greatly changes the parameter of the enemy character 50 of the attribute "water". In addition, in the attribute of the player character 40, there may be a "disadvantageous attribute" having an amount of change in the parameter 51 of the enemy character 50 to be less than the other attributes, and such a case is a case where the compatibility between the player character 40 and the enemy character 50 is low (not high). For example, for the enemy character 50 of the attribute "water", the player character 40 of the attribute "fire" is the player character 40 of a "disadvantageous attribute". Thus, for the player character 40 of the attribute "fire", the amount of change in the parameter of the enemy character 50 of the attribute "water" is small. Here, the compatibility (relation) between the attribute of the character 40 and the enemy character 50, for example, may be set in advance or may be determined for a game of each round.

In a case where there is a plurality of player characters 40, the parameter 51 of the enemy character 50 may be changed for each of the plurality of player characters 40. In such a case, as illustrated in FIGS. 7A and 7B, the performance having a content of attacking the enemy character 50 is displayed for each of the plurality of player characters 40 in the game view. In the example illustrated in FIGS. 7A and 7B, first, after performance of an attack content by the player character 40 of the attribute A is displayed as illustrated in FIG. 7A, as illustrated in FIG. 7B, performance having an attack content by the player character 40 of the attribute B is displayed.

In addition, as illustrated in FIGS. 7A and 7B, the parameter 51 of the enemy character 50 is changed according to a predetermined action performed by the player character 40. In the example illustrated in FIGS. 7A and 7B, for each of the plurality of player characters 40, the parameter 51 of the enemy character 50 is decreased. For example, in the case illustrated in FIG. 7A, the parameter 51 of the enemy character 50 is decreased by a predetermined action executed using the player character 40 of the attribute A. On the other hand, in the case illustrated in FIG. 7B, the parameter 51 of the enemy character 50 is decreased by a predetermined action executed using the player character 40 of the attribute B different from the player character 40 of the attribute A.

Figure 8:
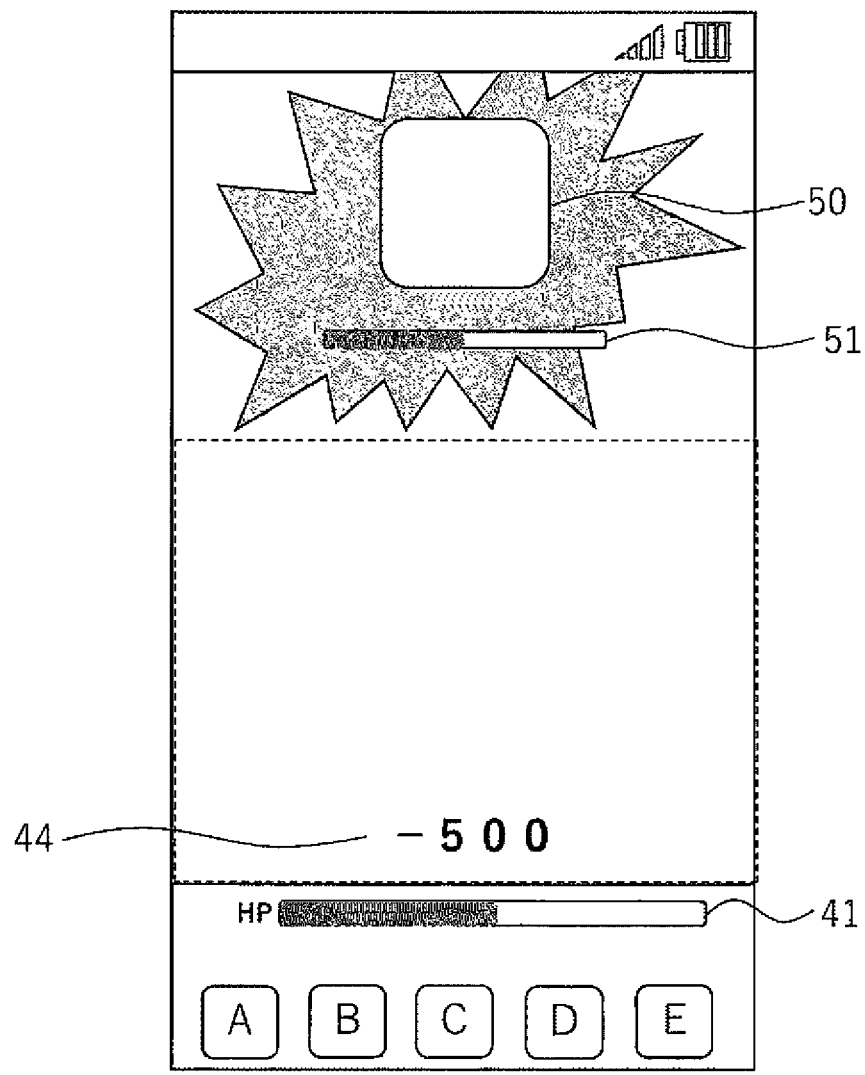
FIG. 8 is a schematic diagram that illustrates a plurality of fields included in a game progressing in a mobile terminal according to an embodiment.

FIG. 8 is another schematic diagram that illustrates a game content displayed on the display 140. FIG. 8 is a display example of a game view of a case where the enemy character 50 changes the parameter 41 of the player.

As illustrated in FIG. 8, the parameter 41 of the player is changed by a predetermined action of the enemy character 50. For example, the parameter 41 of the player is decreased by a predetermined action of the enemy character 50. For example, in a case where an attack against the player (in other words, a predetermined action made by the enemy character 50 for changing the parameter 41 of the player) is made, performance representing the reception of an attack from the enemy character 50 is displayed, and the parameter 41 of the player is decreased. For example, as illustrated in FIG. 8, in a case where performance representing an attack made by the enemy character 50 is displayed in the area 22 of the field 20, the parameter 41 of the player is decreased. The performance representing an attack made by the enemy character 50 may be displayed in the whole field 20. In addition, in the game view, any performance may be displayed, as long as the performance allows the player to recognize an appearance of receiving an attack from the enemy character 50 (in other words, an appearance in which the parameter stored in association with the player is decreased). The amount of change in the parameter stored in association with the player may be displayed as an icon, an image, or text data 44. In the example illustrated in FIG. 8, "–500" is displayed as the amount of change in the parameter of the player by a predetermined action of the enemy character 50.

(Example of Operation of Mobile Terminal 100)

Figure 9:
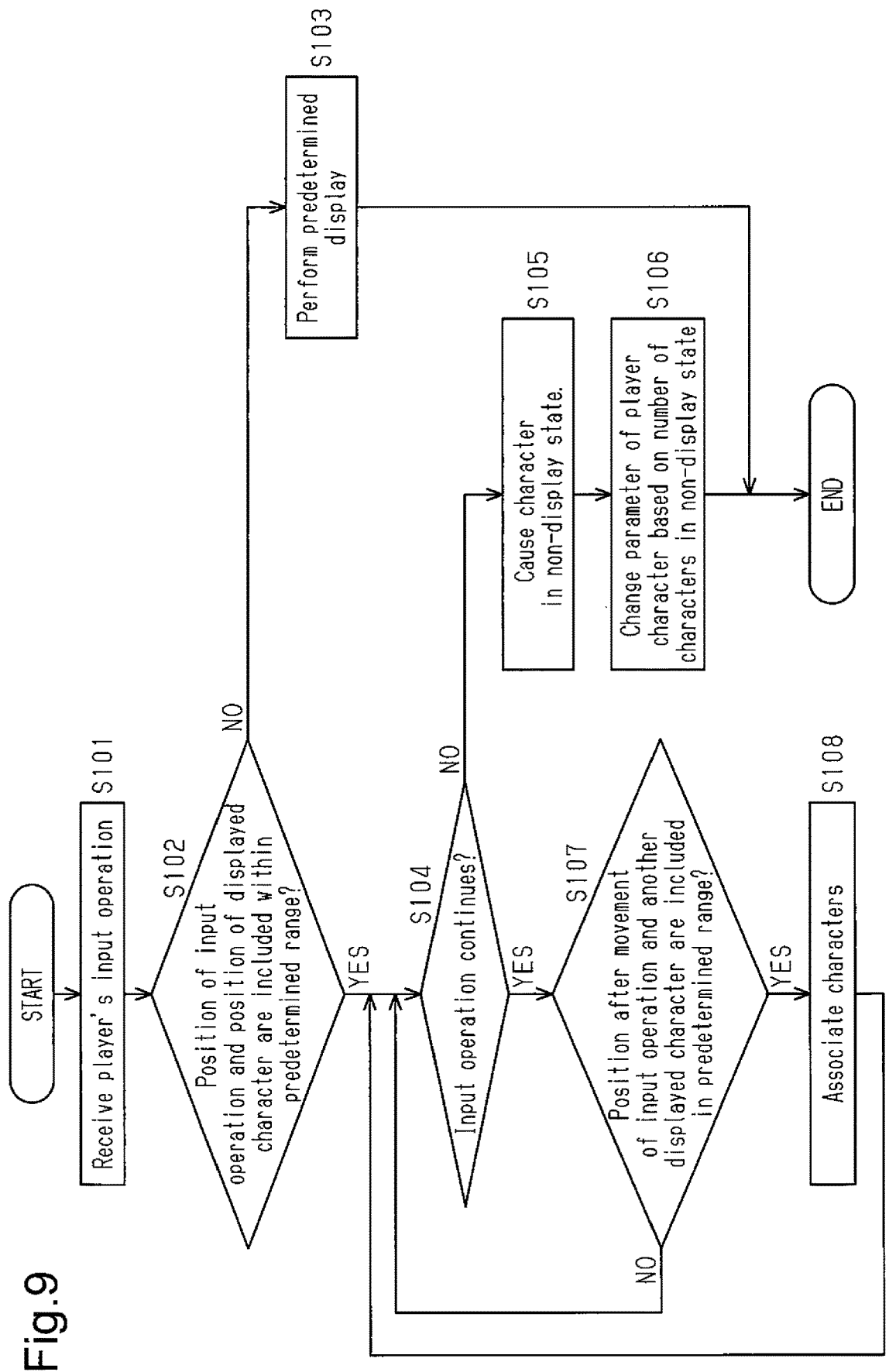
FIG. 9 is a flowchart that illustrates the process of a game according to an embodiment.

FIG. 9 is a diagram that illustrates an example of the operation of a mobile terminal 100 according to the first embodiment. The example illustrated in FIG. 9 is an operation example of a case where the character 30 displayed inside the area 21 of the field 20 is caused to be in the non-display state in accordance with a predetermined input operation performed by a player.

The user interface 150 of the mobile terminal 100 receives a player's input operation for the touch panel (S101).

Next, the information processing unit 131 determines whether or not the position of a player's input operation is included inside a predetermined range associated with a displayed character 30 (S102).

In a case where the position is determined not to be included inside the predetermined range (No in S102), the display processing unit 132 displays a predetermined display (for example, text data of "Miss") on the periphery of the position of the input operation (S103).

On the other hand, in a case where the position is determined to be included within a predetermined range (Yes in S102), the information processing unit 131 determines whether or not an input operation is continued, in other word, whether or not an input operation has been released (S104).

In a case where the input operation is determined not to be continued (No in S104), the information processing unit 131 causes the character 30 to be in the non-display state (S105) and changes the parameter of the player character 40 on the basis of the attributes and the number of the characters 30 caused to be in the non-display state (S106).

In a case where the input operation is determined to be continued (Yes in S104), it is determined whether or not the position after the movement of the input operation is included within a predetermined range relating to another displayed character 30 (S107).

In a case where the position after the movement is determined not to be included within the predetermined range (No in S107), the process is returned to S104. On the other hand, in a case where the position after the movement is determined to be included within the predetermined range (Yes in S107), the character 30 and another character 30 are associated with each other (S108), and the process is returned to S104.

The effects of the present disclosure will be described again. According to one embodiment of the present disclosure, a predetermined input operation of a player for a character 30 freely moving around in a game view is detected, and the character 30 is caused to be in the non-display state, and the parameter of the player character 40 can be changed on the basis of the character 30 that has become the non-display state. For this reason, a game associated with a player's intuitive input operation can be provided. In addition, a game having a high strategic level allowing selection to cause one character 30 to be in the non-display state each time or to cause a plurality of characters 30 to be in the non-display state together by performing one of a plurality of operations can be provided for a player.

(Examples Relating to Item)

Inside the area 21 of the field 20, in addition to the characters 30, an item 33 may be displayed. The item 33 is used for allowing a player to acquire a certain reward within a game. By performing a predetermined input operation for the item 33, a predetermined action (effect) associated with the item 33 can be executed. For this reason, the progress of a game can be diversified, and a game having high continuity can be provided for a player.

Figure 10:
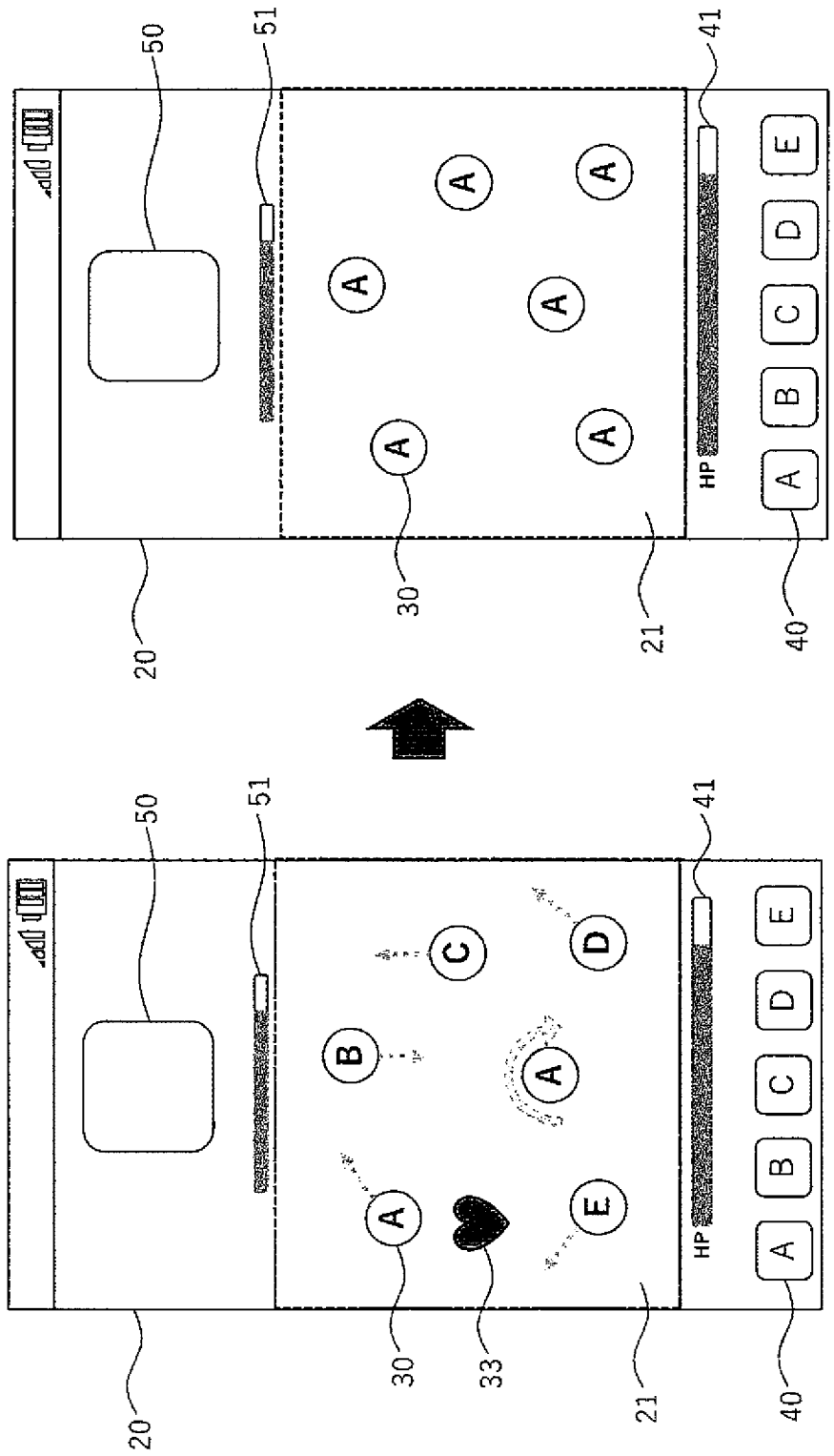

FIGS. 10A and 10B are diagrams that illustrate a configuration example of a game view of a case where the item 33 is displayed inside the area 21 of the field 20. The item 33, similar to the character 30, is displayed inside the area 21 of the field 20. The item 33 may be configured not to move from a displayed position. In addition, the item 33 may be configured to move inside the area 21. Furthermore, the item 33 may be caused to be in the non-display state after a predetermined time elapses after the display.

The form of the item 33, similar to the character 30, is different depending on a game content. In the example illustrated in FIG. 10A, the item 33 may be any object such as a person, an animal, fish, an insect, or the like and may be a car, an airplane, or the like. The item 33 does not need to be an icon or an image of an animal or the like and, for example, may be a symbol such as ○ or ∆, a letter, or the like. In other words, the item 33 may be any object as long as it can be arranged in the field 20 and move inside the area 21 of the field 20.

In a case where a predetermined input operation of the player for the item 33 is detected, a predetermined effect associated with the item 33 is executed. The predetermined effect, for example, is temporary fixing of the display of the character 30 displayed inside the area 21 of the field 20. As a result, a game progressing by a predetermined input operation for the character 30 that is allowed to be easily performed can be provided for a player.

In addition, the predetermined effect, for example, may be an increase in the parameter 41 of the player.

Furthermore, the predetermined effect is, for example, to translate mutually-different attributes of characters 30 into a same attribute. As illustrated in FIG. 10B as an example, for example, as a predetermined effect, a plurality of characters 30 of mutually-different attributes are translated into a same attribute. In other words, the information processing unit 131 translates the attributes of a plurality of characters 30 displayed in the field 20 into a same attribute. Then, the display processing unit 132 displays the characters 30 of the attribute after the translation inside the area 21 of the field 20. As a result, a player's input operation for the player characters 40 of the attribute after the translation can be easily performed, and the player characters 40 of the attribute after the translation can be caused to be in the non-display state in accordance with an input operation of the player. As a result, the parameters of the player characters 40 corresponding to the attribute after the translation can be increased much.

The information processing unit 131 of the mobile terminal 100A receives a players input operation for the user interface 150 and determines whether or not the position of the input operation is included within a predetermined range relating to the item 33 displayed on the display 140.

Then, in a case where the information processing unit 131 determines that the position is within the predetermined range, the display processing unit 132 causes the item 33 to be in the non-display state and executes a predetermined effect associated with the item 33.

(Example Relating to Combo)

In a case where characters 30 are caused to be in the non-display state by receiving a player's predetermined input operation, a non-display number parameter associated with the number of the characters 30 to be caused to be in the non-display state may be changed. The non-display number parameter, for example, may be referred to as a combo.

Figure 11:
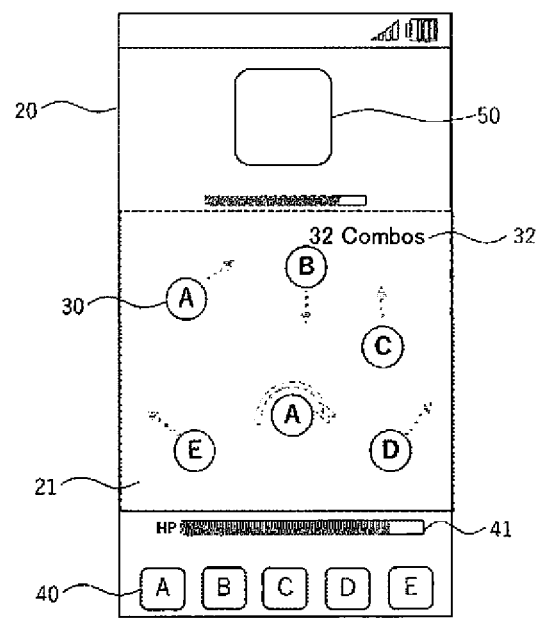

FIG. 11 is a display example of a game view of a case where the value of the combo as the non-display number parameter is displayed. The value of the combo as the non-display number parameter is displayed as a combo number 32 at an arbitrary position in the game view.

For example, a touch made by a player is detected, and the value of the combo number 32 is increased by "1" in accordance with the causing of the character 30 to be in the non-display state. Here, the amount of increase in the combo number 32 is merely an example, and a predetermined amount can be increased. In other words, in a case where a player's touch is detected, and a determination of causing a character 30 to be in the non-display state is made, the information processing unit 131 performs the process of causing the character 30 to be in the non-display state. In addition, in a case where a player's touch is detected, and a determination of causing the character 30 to be in the non-display state is made, the information processing unit 131 performs the process of increasing the combo number 32 by "1".

Furthermore, for example, also in a case where a player's predetermined operation is detected, a plurality of characters 30 are associated with each other, and the characters 30 associated with each other are caused to be in the non-display state at a time, the value of the combo number 32 is increased by "1". In other words, also in a case where a plurality of characters are caused to be in the non-display state at a time, similarly to a case where the characters 30 are caused to be in the non-display state one by one, the combo number 32 is changed only by "1". In other words, in a case where a player's predetermined operation is detected, and a determination of causing a plurality of characters 30 to be in the non-display state is made, the information processing unit 131 causes the plurality of characters 30 associated with each other to be in the non-display state. In addition, in a case where a player's predetermined operation is detected, and a determination of causing a plurality of characters 30 to be in the non-display state is made, the information processing unit 131 performs the process of increasing the combo number 32 by "1".

In a case where a predetermined condition is satisfied, the value of the combo number 32 is reset. For example, in a case where a predetermined condition is satisfied, the value of the combo number 32 is cleared and is reset to an initial value (for example, zero). For example, in a case where a touch is detected in an area in which no character 30 is present, the value of the combo number 32 is cleared and is reset to an initial value (for example, zero). In addition, in a case where an attack from the character 30 or the enemy character 50 is received or in a case where the association of a plurality of characters 30 is resolved, the value of the combo number 32 is cleared and is reset to an initial value (for example, zero).

Then, in a case where the combo number 32 exceeds a predetermined amount, a predetermined effect of decreasing the parameter 51 of the enemy character 50 is executed. For example, in a case where the combo number 32 exceeds "50" as the predetermined amount, the game view is switched, and performance for decreasing the parameter of the enemy character 50 is displayed. Here, the performance generated in accordance with the combo number exceeding the predetermined amount may be referred to as a fever.

Either in a case where characters 30 are caused to be in the non-display state one by one in accordance with a player's touch or a case where a plurality of characters 30 are associated with each other and caused to be in the non-display state at a time in accordance with a player's flick or swipe for a plurality of characters 30 displayed in an area inside the field 20, the information processing unit 131 increases the value of the combo number 32 by a same value. On the other hand, in a case where a plurality of characters 30 are associated with each other and caused to be in the non-display state at a time, the information processing unit 131 increases the parameter of the player character 40 more than that of a case where the characters 30 are caused to be in the non-display state one by one in accordance with a touch (in other words, there is a bonus point).

By employing the configuration described above, a game allowing selection of one of the effect corresponding to the combo number 32 and the effect of a case where a plurality of characters 30 are associated with each other and the user interface (UI) thereof can be provided for a player. For this reason, the player needs to select one operation to be performed, and the strategic level for winning the game can be improved.

(Example Relating to Resolving of Association of Plurality of Characters 30)

Figure 12B:
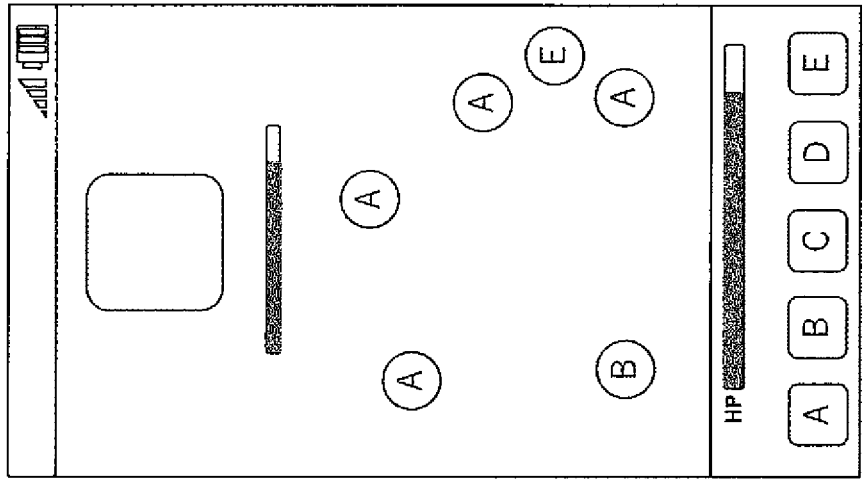
Figure 12A:
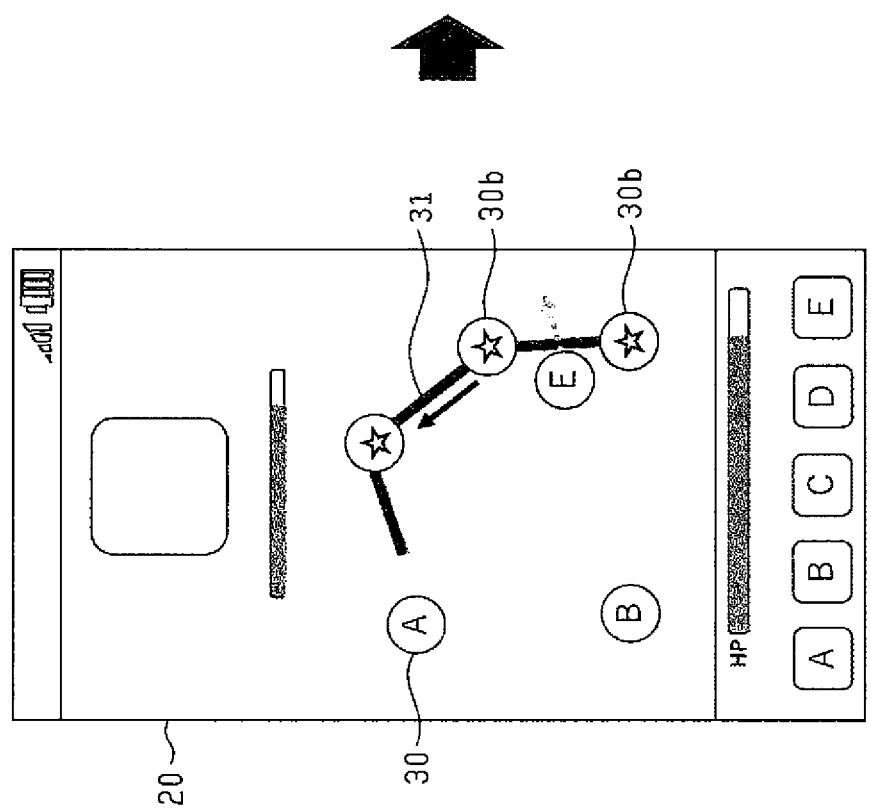

As illustrated in FIGS. 12A and 12B, when a player's flick or swipe is performed for a plurality of characters 30 displayed in the area inside the field 20, the plurality of the characters 30 are associated with each other and thereafter, are caused to be in the non-display state at a time on the basis of a player's predetermined operation (for example, a touch off).

As illustrated in FIG. 12A, a player's input operation (for example, a touch) for one character 30a is detected. Thereafter, a continuous input operation from the player is detected, and, in a case where movement of the position of the input operation up to the inside of a predetermined range associated with another character 30b is detected, the one character 30a and the other character 30b are associated with each other. In such a case, as illustrated in FIG. 12A, a continuous input operation is detected, the display processing unit 132 displays the image 31 of a line segment joining the character 30 selected in the input operation and the position of the current input operation on the display 140.

Here, in a case where a predetermined condition for the displayed image 31 of the line segment is satisfied, the association of a plurality of the characters 30 is resolved. The predetermined condition is, for example, a case where a time relating to the input operation arrives at a predetermined time. More specifically, the predetermined condition is, for example, a case where a predetermined time has elapsed after the start of the input operation or a case where coordinates corresponding to the input operation has not changed for a predetermined time.

In addition, the predetermined condition, as illustrated in FIG. 12A, may be a case where coordinates included in the image 31 of the line segment displayed inside the area 21 of the game field 20 and coordinates included in a range relating to a character 30 moving inside the area 21 coincide with each other. In such a case, as illustrated in FIG. 12B, the association of the characters 30 associated with each other is resolved, and the image 31 of the line segment is caused to be in the non-display state. Here, a character 30 having the coordinates included in the image 31 of the line segment and the coordinates included in the range associated with the character 30 to coincide with each other may have any attribute and may have the attribute of the characters 30 associated with each other. In addition, in a case where the coordinates included in the range relating to another character 30 coincide with not coordinates included in the image 31 of the line segment but coordinates included in a range relating to the character 30 of which movement is fixed by the input operation, in other words, in a case where a character 30 selected by the input operation and another character 30 are brought into contact with each other, the association of the characters 30 associated with each other may be resolved.

In addition, in a case where the coordinates included in the image 31 of the line segment and the coordinates included in the range relating to the character 30 coincide with each other, the process relating to the association of characters 30 may be changed on the basis of the attribute of the character 30. For example, in a case where the coordinates included in the image 31 of the line segment and the coordinates included in the range relating to a character 30 coincide with each other, on the basis of the attribute of the character 30 being the same as the attribute of the character 30 that has already been associated, the character 30 may be newly added to the association. In addition, for example, in a case where the coordinates included in the image 31 of the line segment and the coordinates included in the range relating to a character 30 coincide with each other, on the basis of the attribute of the character 30 being the same as the attribute of the character 30 that has already been associated, the resolving of the association may not be performed.

Furthermore, the association of a plurality of characters 30 may be partially resolved in accordance with a satisfied condition. For example, the coordinates included in the image 31 of the line segment displayed inside the area 21 of the game field 20 and coordinates included in a range relating to a character 30 moving inside the area 21 coincide with each other, only association corresponding to the coordinates coinciding with each other is resolved. Alternatively, in addition to the association corresponding to the coordinates coinciding with each other, another association included in association corresponding to any one of characters 30, which are disposed at both ends, associated with each other to the coordinates coinciding with each other may be resolved.

Figure 13B:
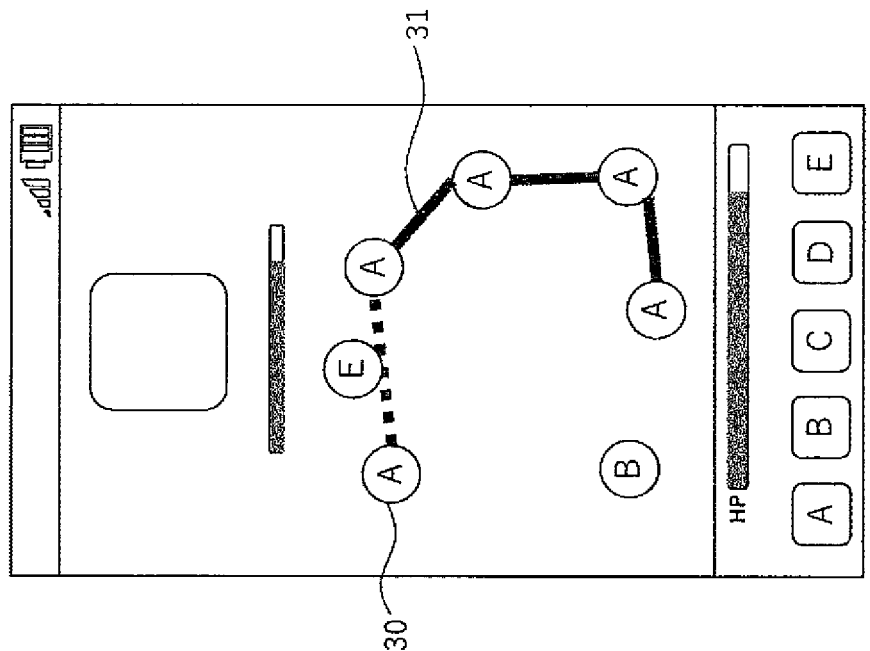
FIGS. 13A to 15D are schematic diagrams that illustrate display contents of a game view of a case where association according to an embodiment is resolved.
Figure 13A:
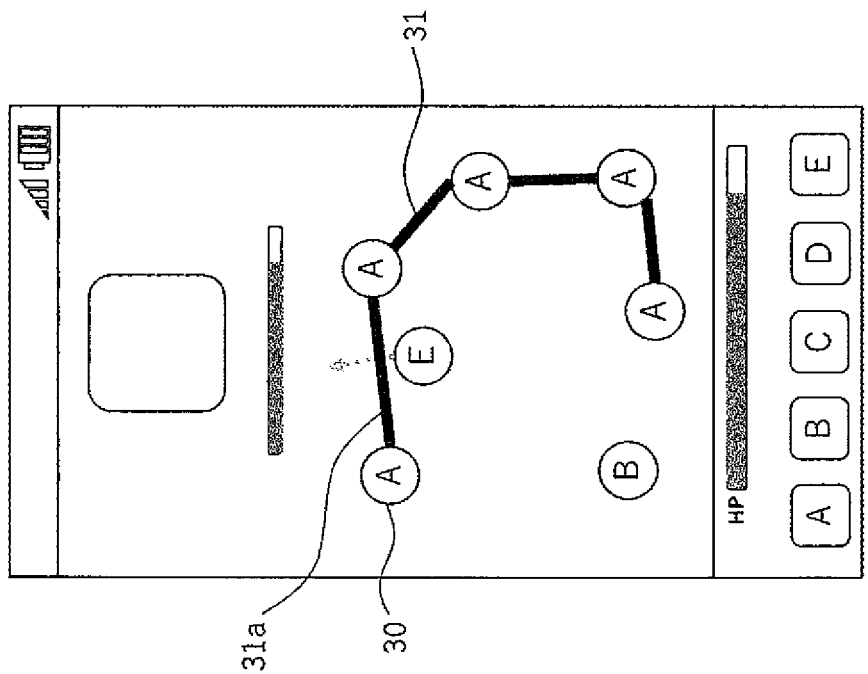

FIGS. 13A and 13B are schematic diagrams that illustrate display contents of a game view of a case where association is resolved. As illustrated in FIG. 13A, characters 30 of a same attribute are associated with each other. In the case illustrated in FIG. 13A, in a case where coordinates included in the image 31 of a line segment and coordinates included in a range relating to a character 30 moving inside the area 21 coincide with each other, as illustrated in FIG. 13B, only association corresponding to the coordinates coinciding with each other may be resolved. More specifically, in FIG. 13B, in the image 31 of the line segment, only association corresponding to a portion (an image 31a of the line segment) coinciding with the coordinates included in the range relating to the character 30 moving inside the area 21 is resolved.

Figure 14B:
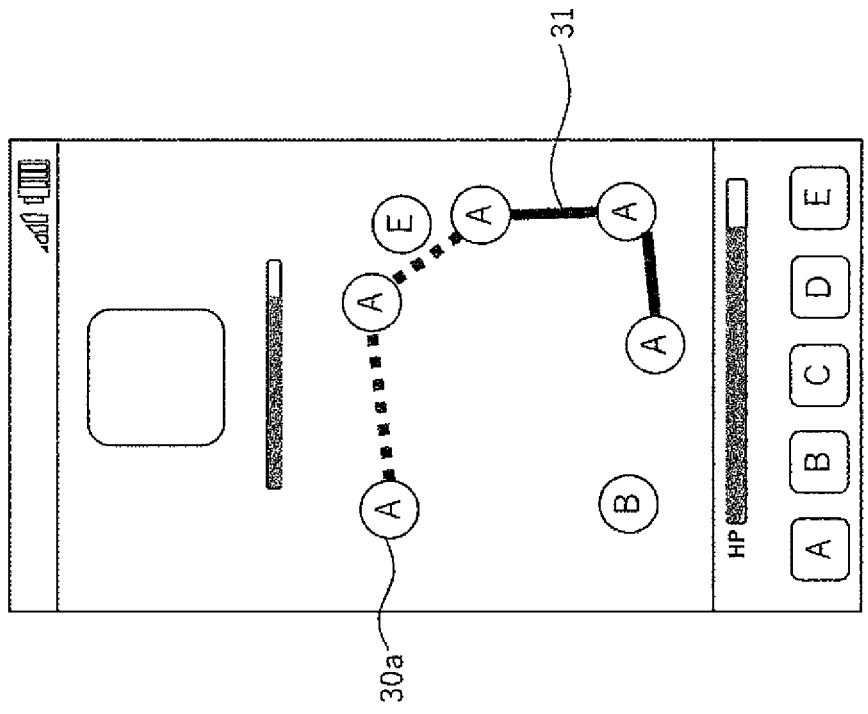
Figure 14A:
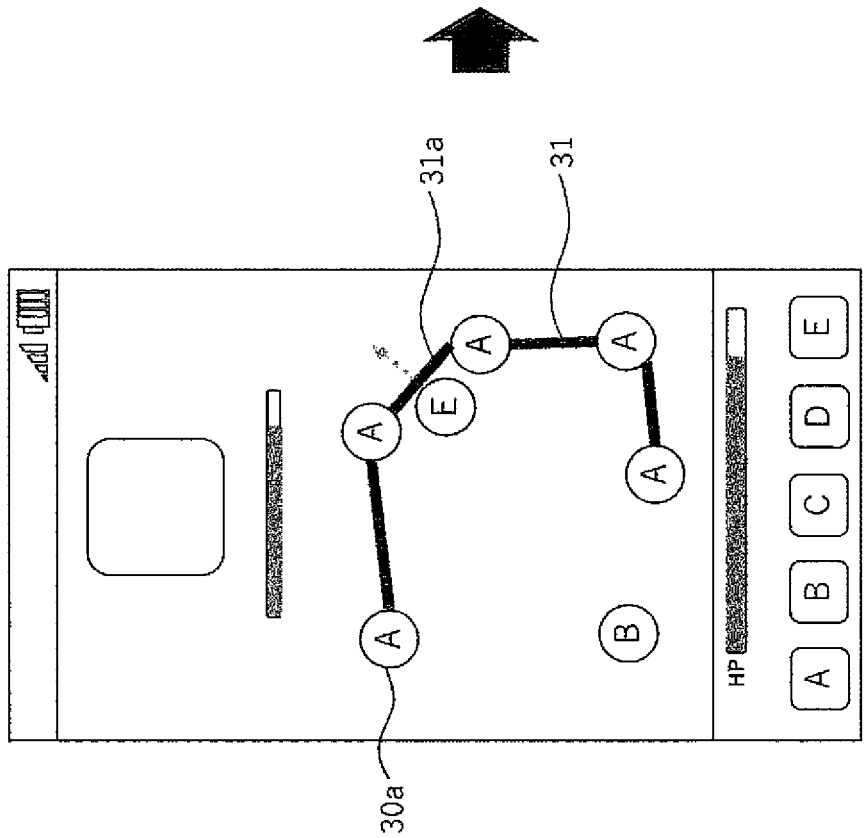

FIGS. 14A and 14B are other schematic diagrams that illustrate display contents of a game view of a case where association is resolved. In the case illustrated in FIG. 14A, in a case where coordinates included in the image 31 of a line segment and coordinates included in a range relating to a character 30 moving inside the area 21 coincide with each other, as illustrated in FIG. 14B, another association included in association corresponding to any one of characters 30, which are disposed at both ends, associated with each other to the coordinates coinciding with each other may be resolved. More specifically, in FIG. 14B, in the image 31 of the line segment, association corresponding to one character 30a out of characters 30, which are disposed at both ends, associated with each other to a portion (an image 31a of the line segment) of the image 31 of the line segment coinciding with the coordinates included in the range relating to the character 30 moving inside the area 21 may be resolved. Any one of the characters 30, which are disposed at both ends, associated with each other, for example, may be a character 30 that is associated first by the player or a character 30 that is associated last among a plurality of characters 30 associated with each other. In addition, in a case where a predetermined condition is satisfied, the association may be sequentially resolved from a character 30 associated first by the player at a predetermined time interval.

Figure 15A:
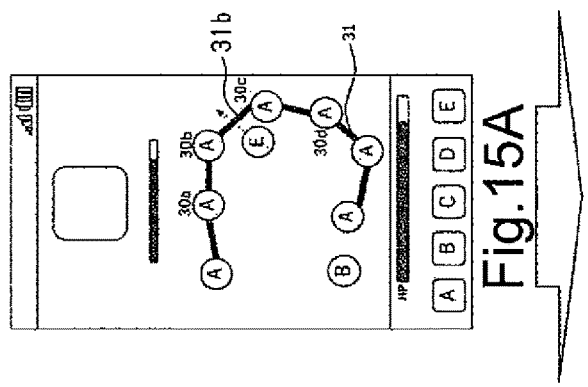
Figure 15D:
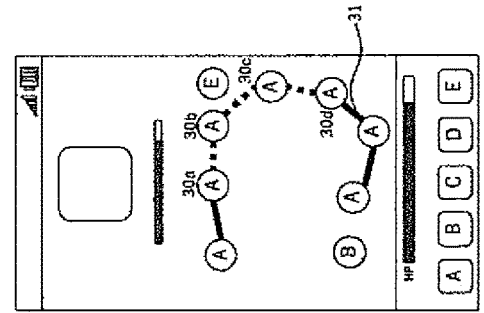
Figure 15C:
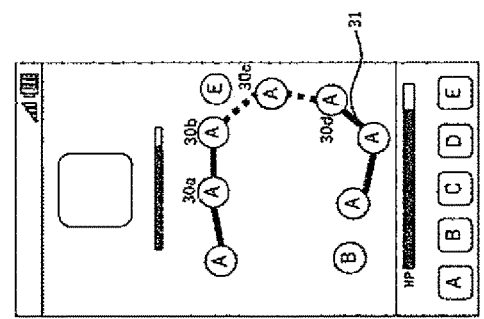
Figure 15B:
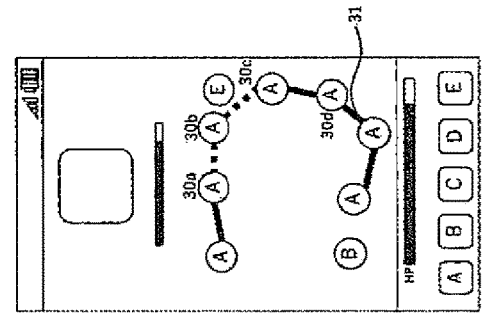

FIGS. 15A to 15D are other schematic diagrams that illustrate display contents of a game view of a case where association is resolved. In the case illustrated in FIG. 15A, in a case where coordinates included in the image 31b of a line segment and coordinates included in a range relating to a character 30 moving inside the area 21 coincide with each other, together with resolving of association of two characters 30 connected to the line segment represented in the image 31b, association of another character 30 adjacent to the two characters 30 and the characters 30 may be resolved. In other words, as illustrated in FIG. 15B, together with resolving of "association between characters 30b and 30c" that are connected to a line segment represented in the image 31b, "association between a character 30a adjacent to the character 30b and the character 30b" may be resolved. In addition, as illustrated in FIG. 15C, together with resolving of "association between characters 30b and 30c" that are connected to a line segment represented in the image 31b, "association between a character 30d adjacent to the character 30c and the character 30c" may be resolved. Furthermore, as illustrated in FIG. 15D, together with resolving of "association between characters 30b and 30c" that are connected to a line segment represented in the image 31b, "association between a character 30a adjacent to the character 30b and the character 30b" and "association between a character 30d adjacent to the character 30c and the character 30c" may be resolved.

In addition, for example, in a case where coordinates included in the image 31 of the line segment and coordinates included in the range relating to the character 30 coincide with each other, the range of association to be resolved may be changed depending on the compatibility (relation) between the attribute of the character 30 and the attribute of a character 30 that has already been associated. For example, in a case where the compatibility (relation) between the attribute of the character 30 and the attribute of the character 30 that has already been associated is high, the range of association to be resolved may be decreased (or increased). On the other hand, in a case where the compatibility (relation) between the attribute of the character 30 and the attribute of the character 30 that has already been associated is low (not high), the range of association to be resolved may be increased. In addition, in a case where the attribute of the character 30 is different from the attribute of the character 30 that has already been associated, the range of association to be resolved may be increased to be larger than that of a case where the attributes are the same.

In addition, in a case where a plurality of characters 30 are not associated, when a predetermined condition is satisfied, an image 31 of a line segment joining input points (the position of a player's first input operation and the position of the current input operation) may be caused to be in the non-display state to resolve the input operation. Here, the predetermined condition is, for example, a case where coordinates included in the image 31 of the line segment displayed inside the area 21 of the game field 20 and coordinates included in the range relating to a character 30 moving inside the area 21 coincide with each other. In addition, in a case where the input operation is resolved, the information processing unit 131 progresses the game by assuming that the input operation has not been performed.

As described above, in a case where a predetermined condition for the displayed image 31 of the line segment is satisfied, the association of a plurality of characters 30 is resolved. For this reason, the player needs to be cautious not to allow another character 30 to be in contact with the image 31 of the line segment (more specifically, coordinates included in the image 31 of the line segment and coordinates included in a range relating to a character 30 moving inside the area 21 do not coincide with each other). For this reason, a game capable of increasing player's tension and excitement can be provided. In addition, in the game field 20, in order to associate a plurality of characters 30, the player can be allowed to consider a direction and a position for associating the character 30, and accordingly, a game capable of improving the strategic level can be provided.

In the description presented above, a configuration in which the information processing device according to one aspect of the present disclosure functions as a mobile terminal (client device), and the program according to one aspect of the present disclosure is executed in the mobile terminal as a so-called native application (native game) has been described. However, the present disclosure is not limited thereto, and a configuration may be employed in which the information processing device according to one aspect of the present disclosure functions as a server, a part or the whole of the program according to one aspect of the present disclosure is executed in the server as a so-called web application (web game), and a result of the executed process is returned to the mobile terminal.

In the embodiment described above, a configuration may be employed in which a part or the whole of each unit (particularly, the controller 130) described to be included in the information processing device 100A as a mobile terminal is included in an information processing device 200 ' as a server device, and the information processing device 200' transmits an output result of a game to the mobile terminal 100A on the basis of an input applied to the mobile terminal 100A. In such a case, the information processing device 200' can render the same effects as those rendered by the mobile terminal 100A in a case where the mobile terminal 100A provides the function.

In addition, in a case where a result of a game is displayed through a web browser, the mobile terminal 100A, for example, can store information received from the server 200' in a predetermined storage area (web storage) built in the web browser.

Furthermore, the game may be configured as a hybrid game in which each of the information processing device 200' and the mobile terminal 100A is responsible for a part of the process like a configuration in which the game view is displayed by a web application in the mobile terminal 100A on the basis of data generated by the information processing device 200', and the other menu views and the like are displayed by a native application installed in the mobile terminal 100A or the like.

In addition, also in a case where the game program according to the present disclosure is realized as a native application executed by the mobile terminal 100A, the mobile terminal 100A, by accessing the information processing device 200' as is necessary, may download and use information relating to the progress of the game (for example, information relating to a player, information relating to another player having friendship with the player, information relating to an accumulated points, items, and characters associated with the player, ranking information of the player, and the like).

For example, the information processing device 200' may transmit an instruction used for causing the mobile terminal 100 to perform another process on the basis of reception of information that one process is executed in the mobile terminal 100. For example, the information processing device 200' receives information indicating that all the characters 30 inside the area 21 of the field 20 are in the non-display state from the mobile terminal 100 and transmits an instruction used for executing a process for changing the parameter of the enemy character 50 to the mobile terminal 100 on the basis of the reception of the information. In addition, the information processing device 200' may receive an instruction for executing a process having a high load or an instruction for retrieving information having a large amount of data from the mobile terminal 100 and transmit a response corresponding to the received instruction. For example, the information processing device 200' may transmit information relating to performance representing an attack content depending on the attribute of the character 40 for the mobile terminal 100, and information relating to performance representing the attack content of the enemy character 50 to the mobile terminal 100. In addition, the information processing device 200' may receive predetermined information from the mobile terminal 100 and store the received information. For example, the information processing device 200' may receive information relating to the parameter associated with the player and information relating to the parameter associated with the enemy character 50 from the mobile terminal 100 and stores the information relating to the parameters.

The information processing device 200' may receive information relating to the position of a player's input operation from the mobile terminal 100, execute a part (for example, the process of S102 and S103) of the process illustrated in FIG. 9 on the basis of the received information, and transmit a result of the execution to the mobile terminal 100. For example, the information processing device 200' may receive information relating to the position of a player's input operation from the mobile terminal 100 and determine whether or not the position of the player's input operation on the field 20 is included in a predetermined range associated with the character 30 on the basis of the received information of the position. The information processing device 200' may transmit a result of the determination to the mobile terminal 100. In addition, the information processing device 200' may receive information relating to a player's continuous input operation from the mobile terminal 100 and determine whether or not the position of the input operation has moved to be within a predetermined range associated with another character 30 on the basis of the received information. The information processing device 200' may determine whether or not a plurality of characters 30 are to be associated with each other on the basis of a result of the determination. Then, in the case of the association, the information processing device 200' may transmit information representing association of the plurality of characters 30 to the mobile terminal 100. In addition, the information processing device 200' may receive information relating to a player's continuous input operation from the mobile terminal 100 and transmit information relating to an image 31 of a line segment joining the character 30 selected by the input operation and the position of the current input operation to the mobile terminal 100 on the basis of the received information. Then, the information processing device 200' may determine whether or not coordinates included in the image 31 of the line segment and coordinates included in a range relating to a character 30 moving inside the area 21 coincide with each other. In such a case, in the case of the determination of coincidence, the information processing device 200' may transmit information representing resolving the association of the plurality of characters 30 to the mobile terminal 100.

In addition, the information processing device 200' may receive information relating to the position of a player's input operation from the mobile terminal 100, execute most of the process illustrated in FIG. 9 on the basis of the received information, and transmit a result of the execution to the mobile terminal 100. For example, the information processing device 200' may receive information relating to the position of a player's input operation from the mobile terminal 100, determine whether or not the position of a player's input operation is included in a predetermined range associated with a displayed character 30, and transmit information relating to a result of the determination and information used for displaying a game progressed on the basis of the result of the determination or information used for permitting display to the mobile terminal 100. In such a case, the mobile terminal 100 transmits the information relating to the position of the player's input operation to the information processing device 200' and receives the information used for displaying the game or the information used for permitting the display from the information processing device 200'.

Furthermore, mobile terminals may be connected for enabling communication (for example, so-called peer-to-peer communication such as near field radio communication using Bluetooth (registered trademark) or the like) and play the game as a multi-play game with being synchronized with each other.

In addition, the control method described above may include not only the process described with reference to the flowchart but may arbitrarily include the process executed in each unit included in the controller 130.

Furthermore, the mobile terminal 100A is not limited to the smartphone as illustrated in the drawing. The mobile terminal may be any device as long as the device is an information processing device capable of realizing the functions described in the embodiment described above and, for example, may be a cellular phone, a personal computer (PC), a tablet terminal, or the like.

In addition, each of the controllers of the mobile terminals 100A and 100C and the server 200 may be realized by a logic circuit (hardware) formed in an integrated circuit (IC chip) or the like or may be realized by software using a central processing unit (CPU). In the latter case, each of the mobile terminals 100A to 100C and the server 200 includes a CPU executing commands of a program that is software realizing each function, a read only memory (ROM) or a storage device (this will be referred to as "recording medium") in which the program and various kinds of data are recorded to be readable from the information processing device (or the CPU), a random access memory (RAM) expanding the program, and the like. Then, as the information processing device (or the CPU) reads the program from the recording medium and executes the read program, whereby the object of the present disclosure is achieved. In addition, the program described above may be supplied to the information processing device through an arbitrary transmission medium (a communication network, a broadcast wave, or the like) that can transmit the program. The present disclosure may be realized in the form of a data signal embedded in a carrier wave in which the program is implemented through electronic transmission.

In addition, the program described above, for example, may be implemented using a script language such as ActionScript or JavaScript (registered trademark), an object-oriented program language such as Objective-C or Java (registered trademark), or a markup language such as HTML5. Furthermore, a game system including a mobile terminal (for example, the mobile terminal 100A) including each constituent unit realizing each function realized by the program described above and a server including each constituent unit realizing the remaining functions other than each function described above belongs to the category of the present disclosure.

In addition, the program according to one aspect of the present disclosure may be executed at least in the following three configurations. The program may be executed in (a) a configuration in which the information processing device functions as a client device (for example, a smartphone, a personal computer, or the like), and the program is executed in the client device, (b) a configuration in which the information processing device functions as a server device (for example, a mainframe, a cluster computer, an arbitrary computer that can provide a game service to an external device, or the like), a part or the whole of the program is executed by the server device, and a result of the executed process is returned to the client device, or (c) a configuration in which the process included in the program is arbitrarily shared by a client device and a server device.

Thus, the display function realized by the program (a) may display a game view on the display device by outputting information (for example, display information) to an external display device (for example, a display included in the mobile terminal) communicably connected to the information processing device through a predetermined network (for example, the Internet) or (b) may display a game view on the display device by outputting display information to the display device included in the information processing device.

In addition, (a) a configuration may be employed in which a client device communicably connected to the information processing device through a predetermined network (for example, the Internet) includes a predetermined input device, the client device transmits operation input information input through a predetermined input device (for example, a touch panel included in the mobile terminal) to the information processing device, and an information processing function realized on the information processing device by a program retrieves the operation input information or (b) a configuration may be employed in which the information processing device includes a predetermined input device, and an information processing function retrieves operation input information through the predetermined input device. In addition, for the input made through the input device, for example, a stylus for a touch panel included in the mobile terminal may be used. Furthermore, the input made through the input device, for example, may be obtained by identifying a player's gesture by using a camera, a radar, or the like. More specifically, the client device identifies the motion of a player's fingertip by using a sensor such as a camera, a laser, or the like and recognizes operation input information corresponding to the identified motion of the fingertip as input information. By using a sensor such as a camera or a laser, the player can perform input for the client device even without directly being in contact with a touch panel or the like.

While the present disclosure has been described on the basis of the drawings and the examples, it should be noted that a person skilled in the art can easily perform various modifications and corrections on the basis of the present disclosure. Thus, it should be noted that such modifications and corrections belong to the scope of the present disclosure. For example, each unit, the function included in each step, and the like may be rearranged not to be contradictory to each other, and a plurality of units, steps, or the like may be logically combined into one or be further divided. In addition, the configurations illustrated in the embodiments described above may be appropriately combined.

What is claimed is:

1. A non-transitory computer-readable recording medium storing a program, which when executed by a processor, causes the processor to:
   display, at a touch panel display configured to receive a touch input, an interface for an electronic game, the interface including a plurality of characters each corresponding to one of a plurality of attributes;
   continuously modify a display position of each of the plurality of characters on the interface;
   determine whether a first position of a path of a touch input continuously received at the touch panel display is within a predetermined range of a position of a first character of the plurality of characters that is displayed on the interface;
   determine whether a second position of the path of the touch input continuously received is within the predetermined range of a position of a second character of the plurality of characters that is displayed on the interface;
   associate the first and second characters in response to detecting that the first position is within the predetermined range of the position of the first character and that the second position is within the predetermined range of the position of the second character;
   generate a predetermined effect within the electronic game based on the associated first and second characters upon determining that the touch input is released; and
   release the association of the first and second characters in a case that a positional relationship between at least a third character of the plurality of characters and a line segment connecting the associated first and second characters satisfies a predetermined condition.

2. The non-transitory computer-readable recording medium of claim 1, wherein the program, when executed by the processor, causes the processor to:
   display a line segment on the interface connecting a start position of the touch input and a position after movement along the path of the touch input.

3. The non-transitory computer-readable recording medium of claim 1, wherein
   generating the predetermined effect includes changing a parameter of a player character in accordance with a numerical value determined based on a number of the associated characters.

4. The non-transitory computer-readable recording medium of claim 3, wherein the program, when executed by the processor, causes the processor to:
   change a parameter of the player character that corresponds to an attribute that is associated with each of the associated characters.

5. The non-transitory computer-readable recording medium of claim 3, wherein the program, when executed by the processor, causes the processor to:
   cause the associated characters to be in a non-display state on the interface when the touch input is released.

6. The non-transitory computer-readable medium of claim 5, wherein the program, when executed by the processor, causes the processor to:
   execute an operation in the electronic game based on the parameter of the player character in a case where all of the plurality of characters are caused not to be displayed on the interface.

7. The non-transitory computer-readable medium of claim 6, wherein the program, when executed by the processor, causes the processor to:
   change a parameter of an enemy character based on the attribute corresponding to the parameter of the player character.

8. The non-transitory computer-readable medium of claim 7, wherein the program, when executed by the processor, causes the processor to:
   end the electronic game in a case where the parameter of the enemy character satisfies a predetermined condition.

9. The non-transitory computer-readable medium of claim 3, wherein the program, when executed by the processor, causes the processor to:
   display a predetermined image corresponding to the player character.

10. The non-transitory computer-readable medium of claim 1, wherein the program, when executed by the processor, causes the processor to:

display an item on the interface;
determine whether a position of a touch input is included within a predetermined range relating to the item; and
responsive to determining that the position of the touch input is included in the predetermined range relating to the item, fix a display position of the character on the interface.

11. The non-transitory computer-readable medium of claim 1, wherein
each of the associated characters correspond to a same attribute of the plurality of attributes.

12. An electronic device comprising:
a touch panel display configured to receive a touch input; and
circuitry configured to
display, at the touch panel display, an interface for an electronic game, the interface including a plurality of characters each corresponding to one of a plurality of attributes;
continuously modify a display position of each of the plurality of characters on the interface;
determine whether a first position of a path of a touch input continuously received at the touch panel display is within a predetermined range of a position of a first character of the plurality of characters that is displayed on the interface;
determine whether a second position of the path of the touch input continuously received is within the predetermined range of a position of a second character of the plurality of characters that is displayed on the interface;
associate the first and second characters in response to detecting that the first position is within the predetermined range of the position of the first character and that the second position is within the predetermined range of the position of the second character;
execute a process in the electronic game based on the associated first and second characters upon determining that the touch input is released; and
release the association of the first and second characters in a case that a positional relationship between at least a third character of the plurality of characters and a line segment connecting the associated first and second characters satisfies a predetermined condition.

13. The electronic device of claim 12, wherein
the circuitry is configured to release the association of the associated characters in a case that a line corresponding to the touch input that connects the associated characters intersects at least one other of the plurality of characters.

14. The electronic device of claim 12, wherein
the circuitry is configured to cause the interface to display a graphic indicia connecting a start position of the touch input and a position after movement of the touch input.

15. The electronic device of claim 12, wherein
executing the process includes changing a parameter of a player character in accordance with a numerical value determined based on a number of the associated characters.

16. The electronic device of claim 15, wherein
the circuitry is configured to cause the interface to display an image corresponding to an enemy character in the electronic game and a parameter corresponding to the enemy character.

17. The electronic device of claim 16, wherein the circuitry is configured to:
detect a touch input to select the player character; and
modify the parameter corresponding to the enemy character based on the attribute corresponding to the parameter of the player character.

18. The electronic device of claim 16, wherein the circuitry is configured to:
determine whether the parameter of the player character is a predetermined amount or more; and
modify the parameter corresponding to the enemy character based on the attribute corresponding to the parameter of the player character in response to detecting that the parameter of the player character is a predetermined amount or more.

19. The electronic device of claim 12, wherein
the circuitry is configured to cause the interface to no longer display the associated characters upon determining that the touch input is released.

20. A method performed by an electronic device, the method comprising:
displaying, at a touch panel display configured to receive a touch input, an interface for an electronic game, the interface including a plurality of characters each corresponding to one of a plurality of attributes;
continuously modifying a display position of each of the plurality of characters on the interface;
determining whether a first position of a path of a touch input continuously received at the touch panel display is within a predetermined range of a position of a first character of the plurality of characters that is displayed on the interface;
determining whether a second position of the path of the touch input continuously received is within the predetermined range of a position of a second character of the plurality of characters that is displayed on the interface;
associating the first and second characters in response to detecting that the first position is within the predetermined range of the position of the first character and that the second position is within the predetermined range of the position of the second character;
generating a predetermined effect within the electronic game based on the associated first and second characters upon determining that the touch input is released; and
releasing the association of the first and second characters in a case that a positional relationship between at least a third character of the plurality of characters and a line segment connecting the associated first and second characters satisfies a predetermined condition.

* * * * *